US008494758B2

United States Patent
Ishikawa et al.

(10) Patent No.: US 8,494,758 B2
(45) Date of Patent: Jul. 23, 2013

(54) ENGINE AUTOMATIC-STOP/RESTART SYSTEM

(75) Inventors: Osamu Ishikawa, Chiyoda-ku (JP); Tomohisa Shoda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 535 days.

(21) Appl. No.: 12/850,184

(22) Filed: Aug. 4, 2010

(65) Prior Publication Data
US 2011/0202254 A1 Aug. 18, 2011

(30) Foreign Application Priority Data
Feb. 18, 2010 (JP) ................................. 2010-033545

(51) Int. Cl.
*F02N 11/08* (2006.01)
*F02N 11/00* (2006.01)

(52) U.S. Cl.
USPC ....................................... 701/112; 123/179.4

(58) Field of Classification Search
USPC ............... 701/103, 112, 113, 110; 123/179.3, 123/179.4, 179.1, 179.16, 325, 198 F, 491
See application file for complete search history.

(56) References Cited

U.S. PATENT DOCUMENTS

| 7,051,693 B2 * | 5/2006 | Tetsuno et al. ............. 123/179.5 |
| 7,354,379 B2 * | 4/2008 | Moriya ......................... 477/199 |
| 2006/0142928 A1 * | 6/2006 | Yuya et al. ..................... 701/112 |

FOREIGN PATENT DOCUMENTS

| JP | 4211208 B2 | 3/2002 |
| JP | 4214401 B2 | 1/2005 |

* cited by examiner

*Primary Examiner* — Mahmoud Gimie
(74) *Attorney, Agent, or Firm* — Sughrue Mion, PLLC

(57) ABSTRACT

In an engine automatic-stop/restart system according to the present invention, in the case where an engine self-restoration determination unit determines that an engine can autonomously be restored, fuel supply by a fuel injection control unit is resumed so that the engine is autonomously restored; and in the case where the engine self-restoration determination unit determines that the engine cannot autonomously be restored, the fuel supply by the fuel injection control unit is resumed, and based on an engine rotation speed detected by the engine rotation speed detection unit, a pinion gear rotation speed detected by the pinion gear rotation speed detection unit, and the result of determination by the engine self-restoration determination unit, there is performed the energization or de-energization of the pinion gear driving unit and the starter motor.

6 Claims, 16 Drawing Sheets

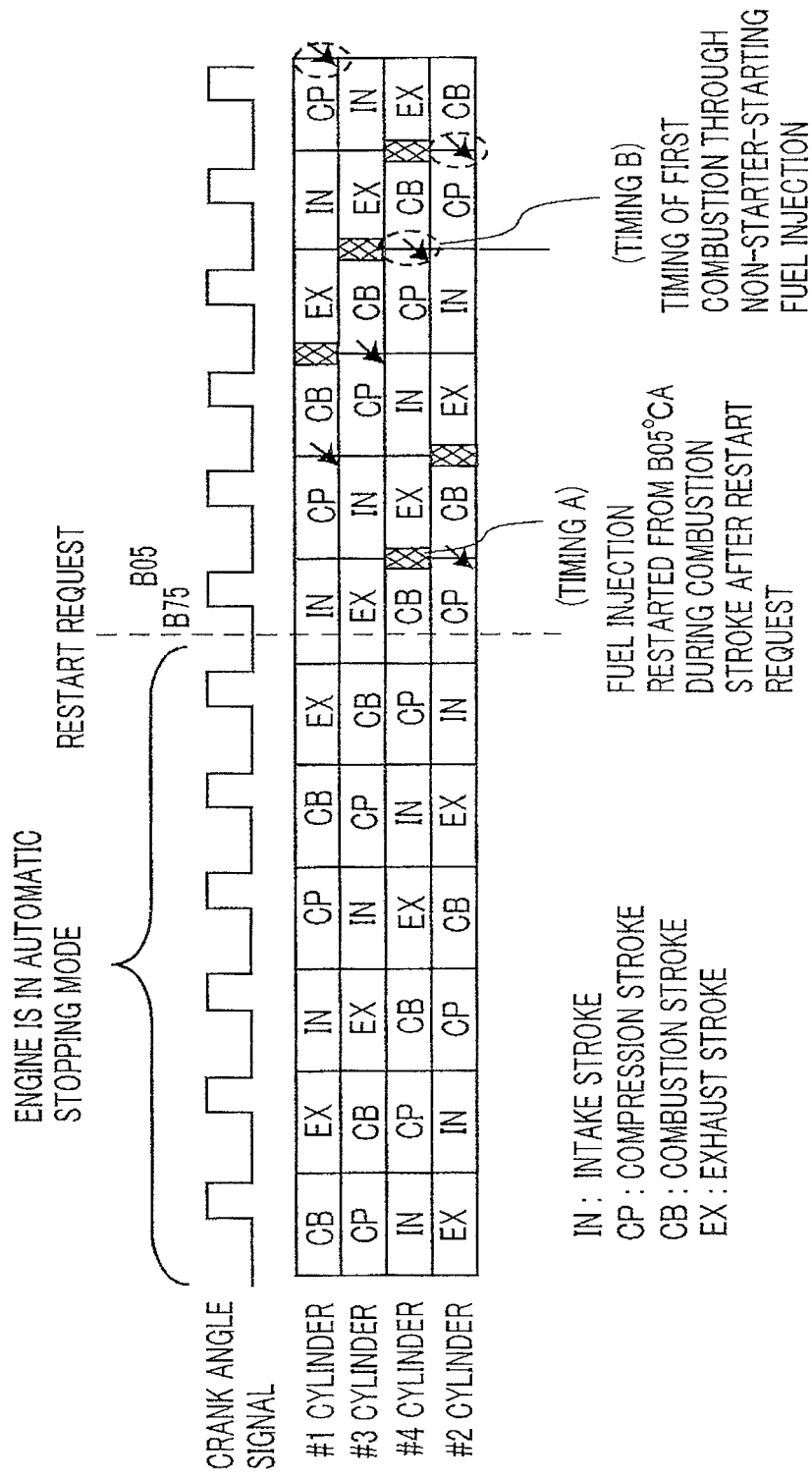

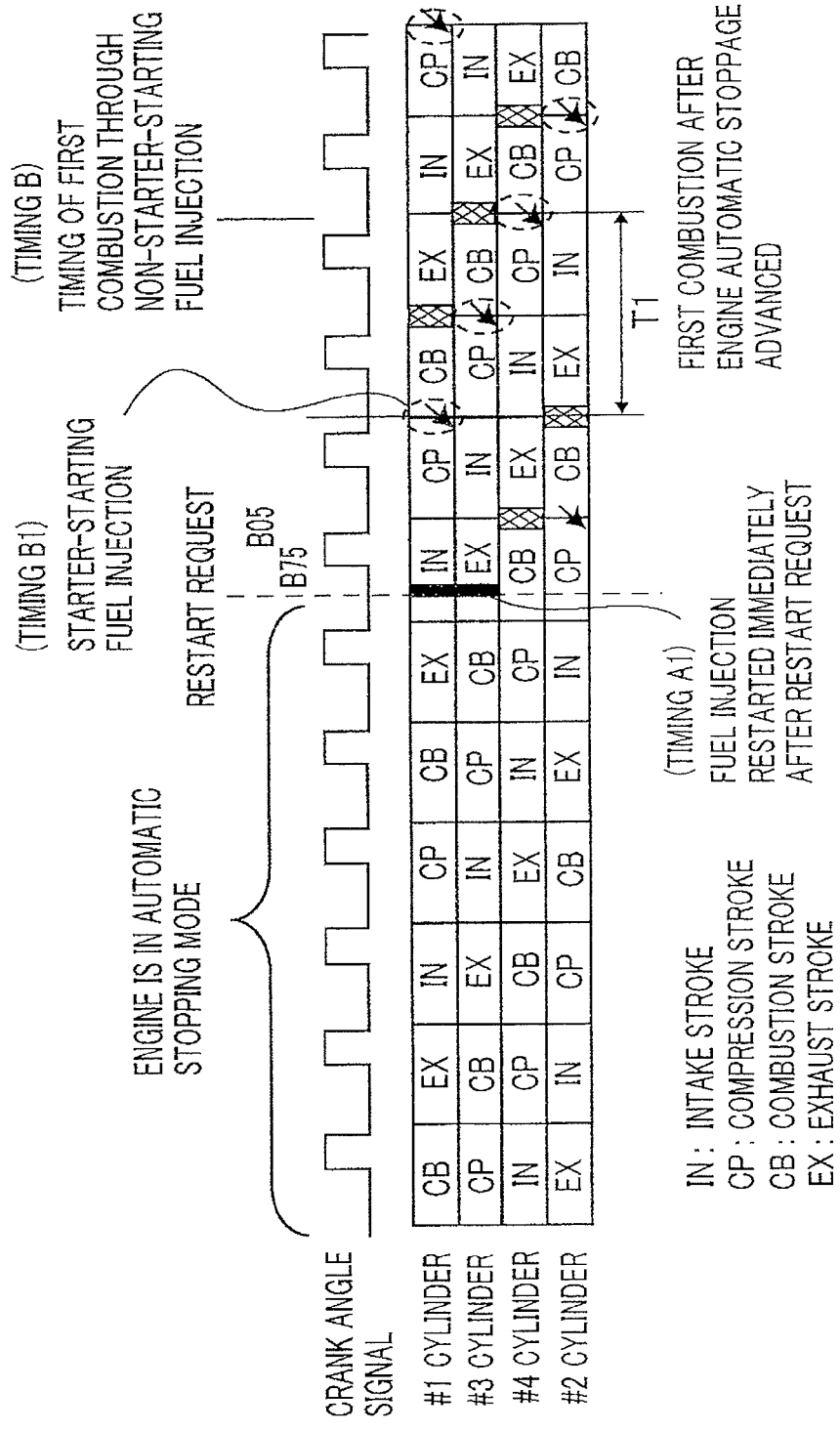

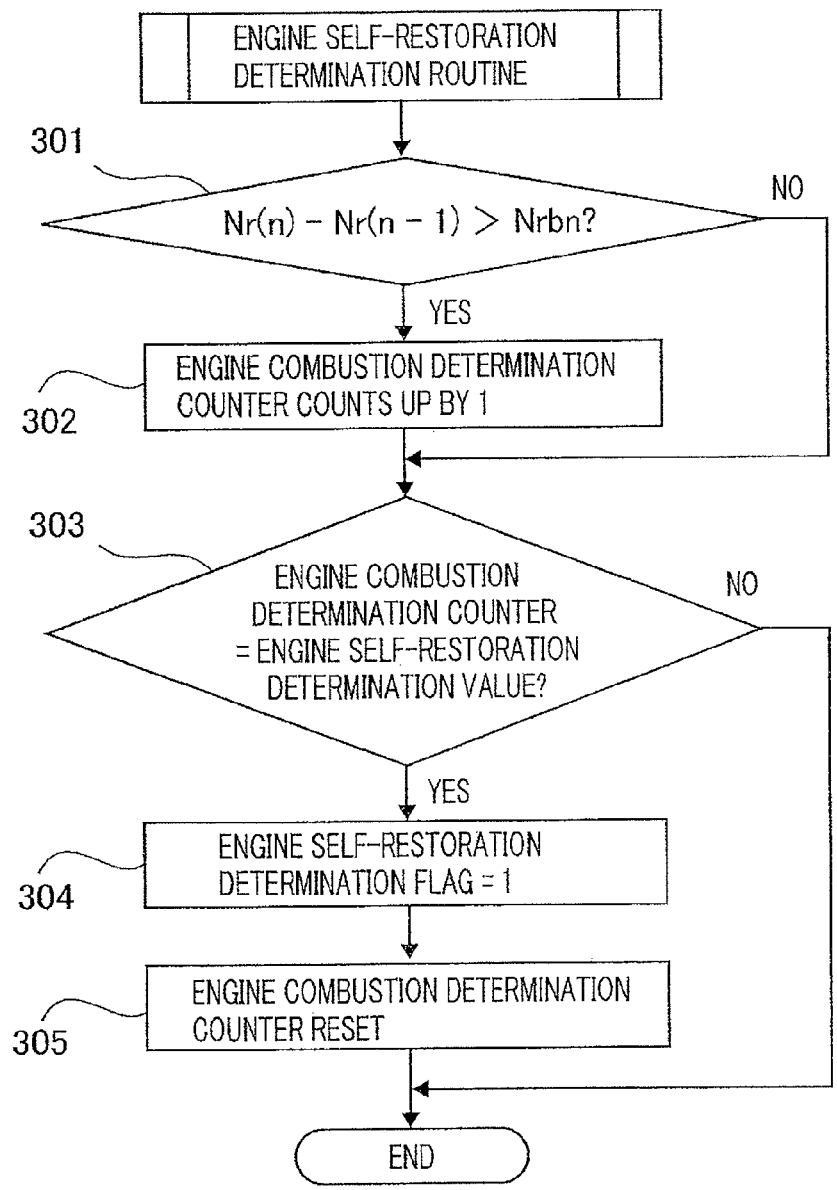

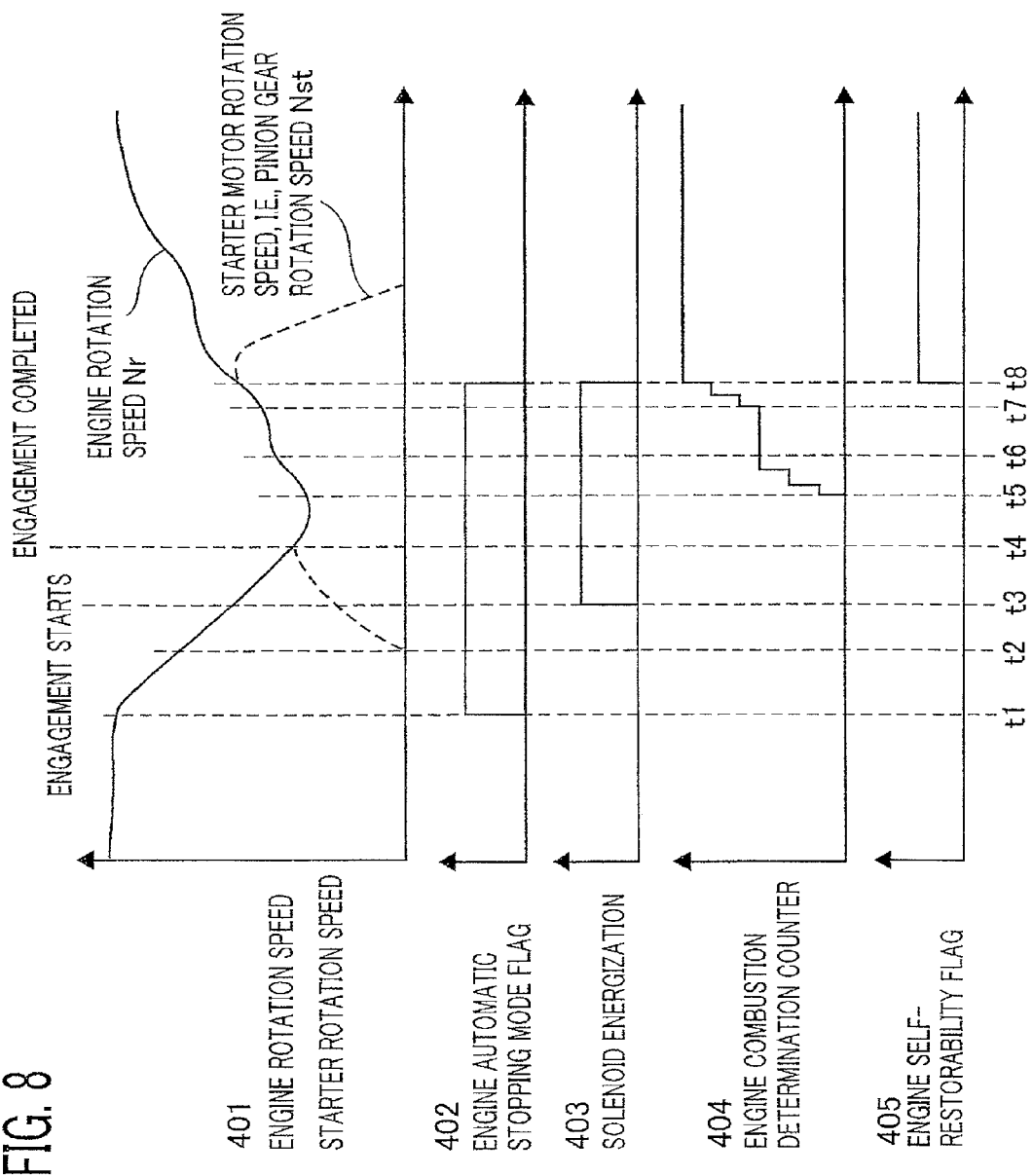

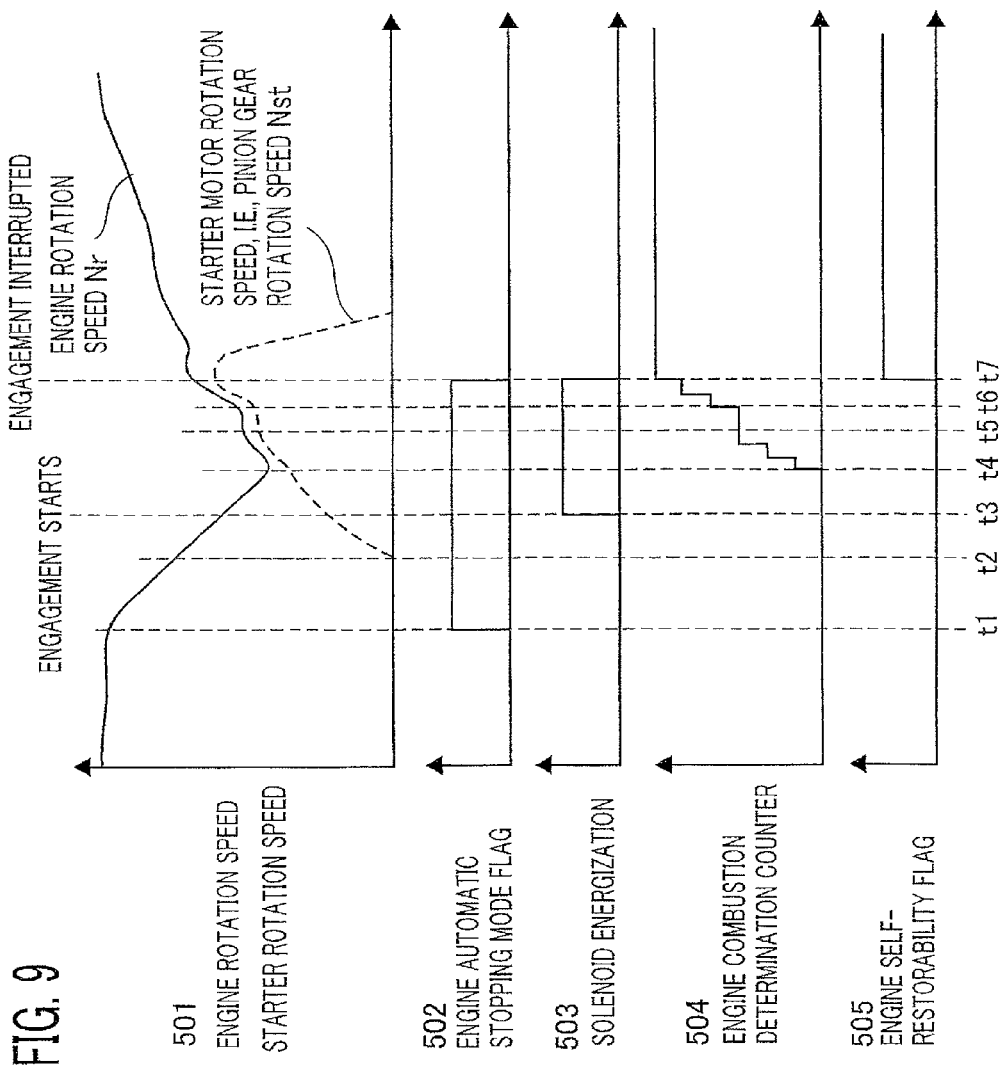

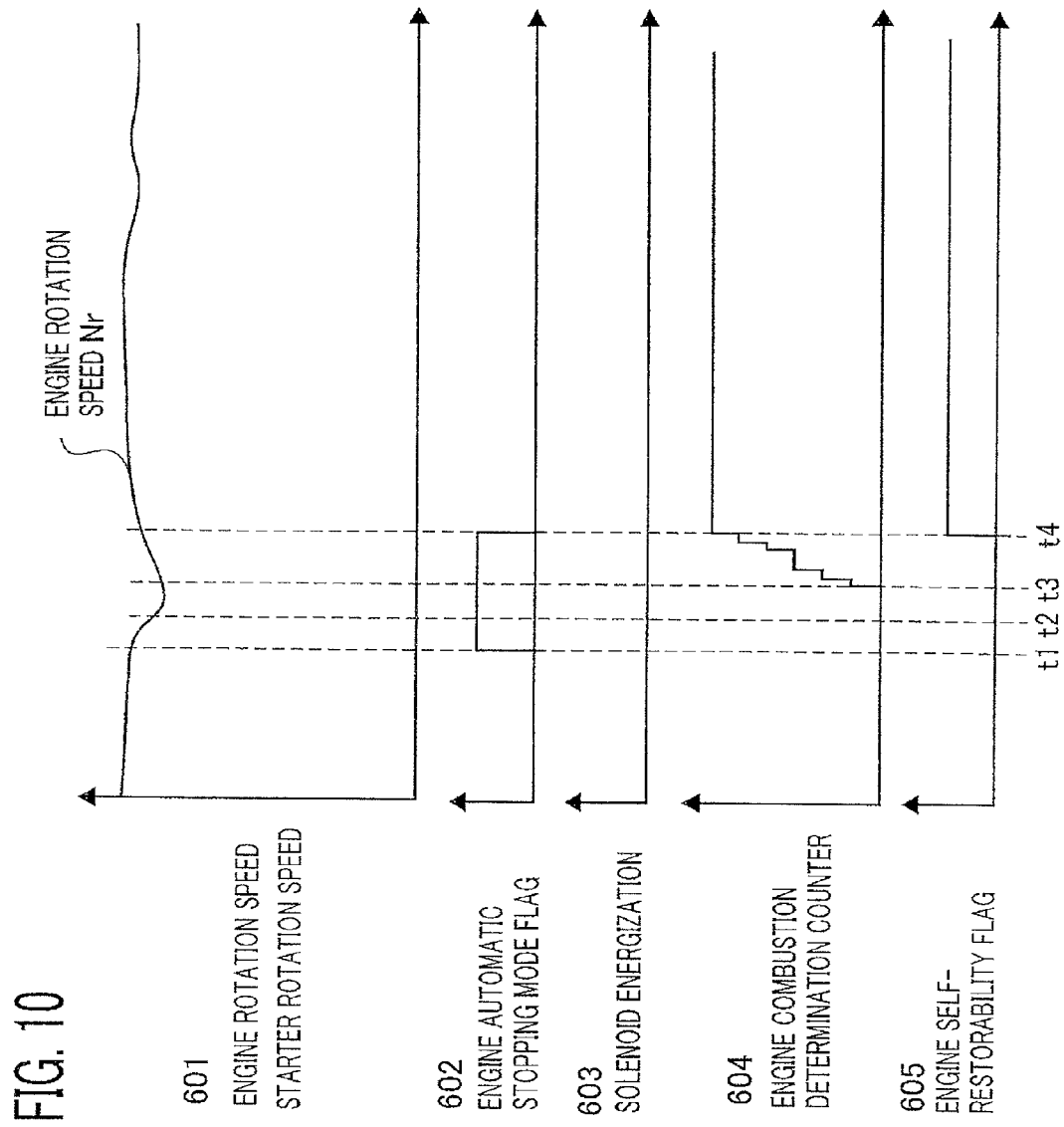

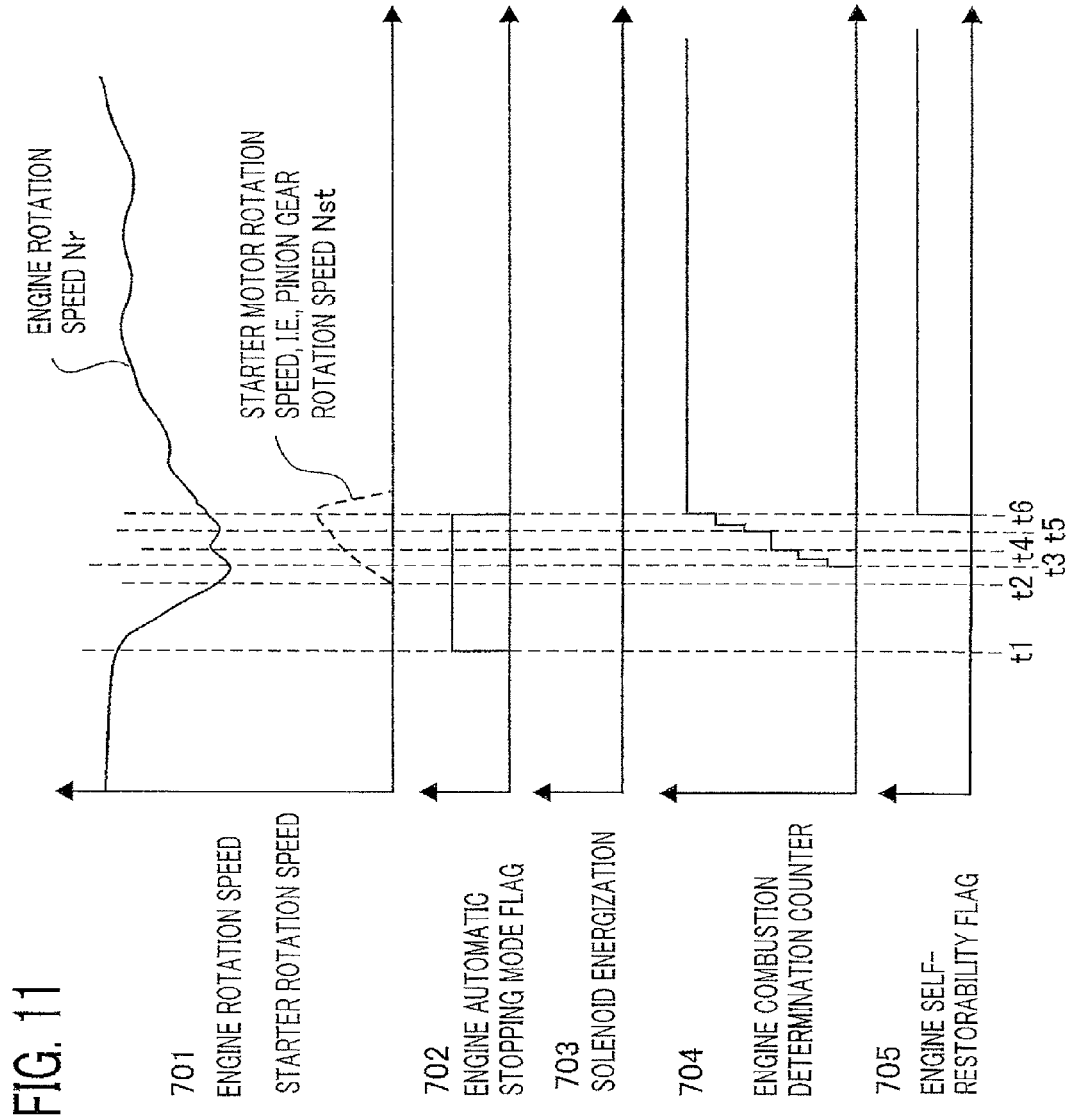

ENGINE AUTOMATIC-STOP/RESTART SYSTEM

BACKGROUND OF THE INVENTION

1. Field of the Invention

The present invention relates to an engine automatic-stop/restart system that automatically stops an engine when a predetermined engine automatic stopping condition is satisfied and then restarts the engine when a restarting condition is satisfied.

2. Description of the Related Art

To date, for the purpose of improving the gasoline mileage of a motor vehicle and reducing an environmental load, there has been developed a so-called engine automatic-stop/restart system that automatically cut off the supply of fuel so as to automatically stop an engine, when the operation of a driver (e.g., braking operation while the motor vehicle travels at a speed lower than a predetermined speed) satisfies a predetermined condition for stopping the engine, and then restarts fuel injection so as to automatically restarts the engine, when the operation of the driver (e.g., brake-releasing operation, accelerator stepping-on operation, and the like) satisfies a predetermined condition for restarting the engine.

To date, as such an engine automatic-stop/restart system, there has been proposed a system (for example, refer to Japanese Patent No. 4214401) in which, when an engine restart request occurs after idling-stop driving is performed, speed-governing energization of the starter motor is started; at a time instant when the rotation speed of the starter motor becomes close to an anticipated rotation speed of the engine, the coupling between the pinion gear and the ring gear is started; at a time instant when the rotation speed of the motor (here unit the rotation speed of the pinion gear, and the same applies hereinafter) and the rotation speed of the engine synchronize with each other, the coupling between the pinion gear and the ring gear is ended; after the end of the coupling, full-power energization of the starter motor is performed so that the starter motor drives the engine; then, the restart of the engine is completed.

In the case of the conventional system disclosed in Japanese Patent No. 4214401, before the rotation of the engine completely stops, the engagement between the pinion gear and the ring gear is realized; therefore, it is made possible to restart the engine rapidly.

In addition, to date, there has been proposed a system (for example, refer to Japanese Patent No. 4211208) in which, when an engine restart request occurs after idling-stop driving is performed, it is determined whether or not restart of the fuel supply can restore the engine to a state where it can autonomously rotate; in the case where it is determined that the engine can be restored to the state where it can autonomously rotate, the engine is restarted merely through fuel supply, without the starter being utilized; in the case where it is determined that the engine cannot be restored to the state where it can autonomously rotate, speed-governing energization of the starter motor is performed, firstly, so as to make the motor rotation speed and the engine rotation speed synchronize with each other, and then full-power energization of the starter motor is performed so that the starter motor drives the engine to restart.

In the case of the conventional system disclosed in Japanese Patent No. 4211208, in the case where it is determined that, merely by supplying the fuel, the engine can be restored to the state where it can autonomously rotate, the engine is restarted merely through fuel supply, without the starter being utilized; therefore, the starter is utilized less frequently, whereby the amount of energy consumption can be reduced.

In the case of the conventional system disclosed in Japanese Patent No. 4214401, the engine rotation speed at a time instant when the pinion gear and the ring gear abut on each other is anticipated so that the motor rotation speed is made to synchronize with the engine rotation speed; however, there has been a problem that accurate anticipation of the engine rotation speed burdens an engine control unit (referred to as an ECU, hereinafter), which controls an engine, with a large load.

The conventional system disclosed in Japanese Patent No. 4214401 operates in such a way that, as represented in FIG. 13, when, at a time instant t1 during a time period, immediately after the engine has automatically stopped due to idling-stop driving, in which the engine rotation speed decreases, an engine restart request occurs, speed-governing energization of the starter motor is started; at a time instant t2 when the motor rotation speed becomes close to an anticipated rotation speed of the engine, coupling between the pinion gear and the ring gear is started; at a time instant t3 when the motor rotation speed and the engine rotation speed synchronize with each other, the coupling between the pinion gear and the ring gear is completed; then, at a time instant t4, restarting of the engine is completed. Although the engine rotation speed can be autonomously restored by restarting the fuel supply and it is not required to drive the starter motor, the energization of the starter motor is continued during a time period from the time instant t1 when the engine restart request occurs to the time instant t4 when the restarting of the engine is completed; thus, the starter is utilized more frequently, whereby there has been a problem that energy is wastefully consumed and the starter motor deteriorates faster.

In the case of the conventional system disclosed in Japanese Patent No. 4211208, as represented in FIG. 14A, after the engine has stopped due to idling-stop driving, it is determined, in accordance with the engine rotation speed at a time instant t1 when the engine restart request occurs, whether or not the engine can autonomously be restored to a state where it can rotate, merely by restarting the fuel injection; in the case where it is determined that the engine cannot autonomously be restored to the state where it can rotate, speed-governing energization of the starter motor is started, and then at a time instant t2, the coupling between the ring gear and the pinion gear is started. However, there has been a problem that, when, at a time instant t3 before the coupling is completed, engine combustion causes a rise in the engine rotation speed, noise occurs because the pinion gear and the ring gear strike each other (the state where they cannot synchronize with each other) while the motor rotation speed and the engine rotation speed maintain relative rotation difference, and the noise continues until a time instant t4 when the starting of the engine is completed.

In contrast, in the case of the conventional system disclosed in Japanese Patent No. 4211208, as represented in FIG. 14B, in the case where it is determined, at the time instant t1 when the engine restart request occurs, that the engine cannot autonomously be restored to the state where it can rotate, speed-governing energization of the starter motor is started, and then at the time instant t2, the coupling between the ring gear and the pinion gear is started; however, in the case where, at the time instant t4 after the time instant t3 when the coupling is completed, engine combustion causes a rise in the rotation speed, the time period where synchronization is impossible does not take place; therefore, noise does not occur.

In the case of the conventional system disclosed in Japanese Patent No. 4211208, as represented in FIG. 15, at a time instant t1 when an engine restart request occurs, it is determined that the engine rotation speed cannot autonomously be restored, and at the time instant t1, speed-governing energization of the starter motor is started; however, even though, at a time instant t2 before the coupling of the pinion gear and the ring gear is started, the rotation speed becomes high enough for the engine to be autonomously restored to rotation and hence it is not required anymore to couple the pinion gear with the ring gear, the speed-governing energization of the starter motor continues, and then at a time instant t3, the pinion gear and the ring gear are coupled so that the starter starts the engine; therefore, there has been a problem that energy is wastefully consumed during a time period from the time instant t2 to the time instant t4 and hence the starter deteriorates faster.

SUMMARY OF THE INVENTION

The present invention has been implemented in order to solve the foregoing problems in those conventional systems; the objective thereof is to provide an engine automatic-stop/restart system that reduces the frequency of coupling between the pinion gear and the ring gear and is superior in durability.

An engine automatic-stop/restart system according to the present invention automatically stops an engine when an engine stopping condition for stopping the engine is satisfied and restarts the engine when an engine restarting condition for restarting the engine that has been stopped is satisfied. The engine automatic-stop/restart system includes a fuel injection control unit that stops fuel supply to the engine when the engine stopping condition is satisfied and resumes the fuel supply when the engine restarting condition is satisfied; a crank angle sensor that detects a crank angle of the engine; a ring gear coupled with the crankshaft of the engine; an engine rotation speed detection unit that detects a rotation speed of the engine; a starter motor that is energized to produce rotation output and is de-energized to stop; a pinion gear that is driven to rotate by the rotation output of the starter motor and transfers the rotation output of the starter motor to the ring gear; a pinion gear rotation speed detection unit that detects a rotation speed of the pinion gear; a pinion gear driving unit that is energized to move the pinion gear in the axis direction thereof and to engage the pinion gear with the ring gear and that is de-energized to release the engagement between the pinion gear and the ring gear; and an engine self-restoration determination unit that determines, based on a rotation speed of the engine detected by the engine rotation speed detection unit, whether or not there can be achieved self-restoration in which the engine restarts merely through resumption of fuel supply, in the case where the engine restarting condition is satisfied at a time after the fuel injection control unit has stopped the fuel supply to the engine and before the engine stops. The engine automatic-stop/restart system is characterized in that, in the case where the engine self-restoration determination unit determines that the engine can autonomously be restored, the fuel supply by a fuel injection control unit is resumed so that the engine is autonomously restored; and in the case where the engine self-restoration determination unit determines that the engine cannot autonomously be restored, the fuel supply by the fuel injection control unit is resumed, and based on an engine rotation speed detected by the engine rotation speed detection unit, a pinion gear rotation speed detected by the pinion gear rotation speed detection unit, and the result of determination by the engine self-restoration determination unit, there is performed the energization or de-energization of the pinion gear driving unit and the starter motor.

According to the present invention, there can be obtained a high-durability engine automatic-stop/restart system that can make the pinion gear and the ring gear engage with each other as gently as possible, in the case where the pinion gear and the ring gear need to be engaged with each other while the engine inertially rotates, without imposing a large calculation load on an engine ECU, unnecessarily coupling the pinion gear with the ring gear, and energizing the starter motor.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIGS. 6A and 6B configure a set of explanatory chart representing starter-off-starting fuel injection and starter-on-starting fuel injection in an engine automatic-stop/restart system according to Embodiment 1 of the present invention;

FIG. 7 is a flowchart representing the flow of an engine self-restoration determination routine in an engine automatic-stop/restart system according to Embodiment 1 of the present invention;

FIG. 8 is a timing chart representing an example of operation in an engine automatic-stop/restart system according to Embodiment 1 of the present invention;

FIG. 9 is a timing chart representing an example of operation in an engine automatic-stop/restart system according to Embodiment 1 of the present invention;

FIG. 10 is a timing chart representing an example of operation in an engine automatic-stop/restart system according to Embodiment 1 of the present invention;

FIG. 11 is a timing chart representing an example of operation in an engine automatic-stop/restart system according to Embodiment 1 of the present invention, in the case where an engine is restarted in such a way that a starter and the engine are not coupled with each other while the engine rotates;

DETAILED DESCRIPTION OF THE PREFERRED EMBODIMENTS

Embodiment 1

Figure 1:
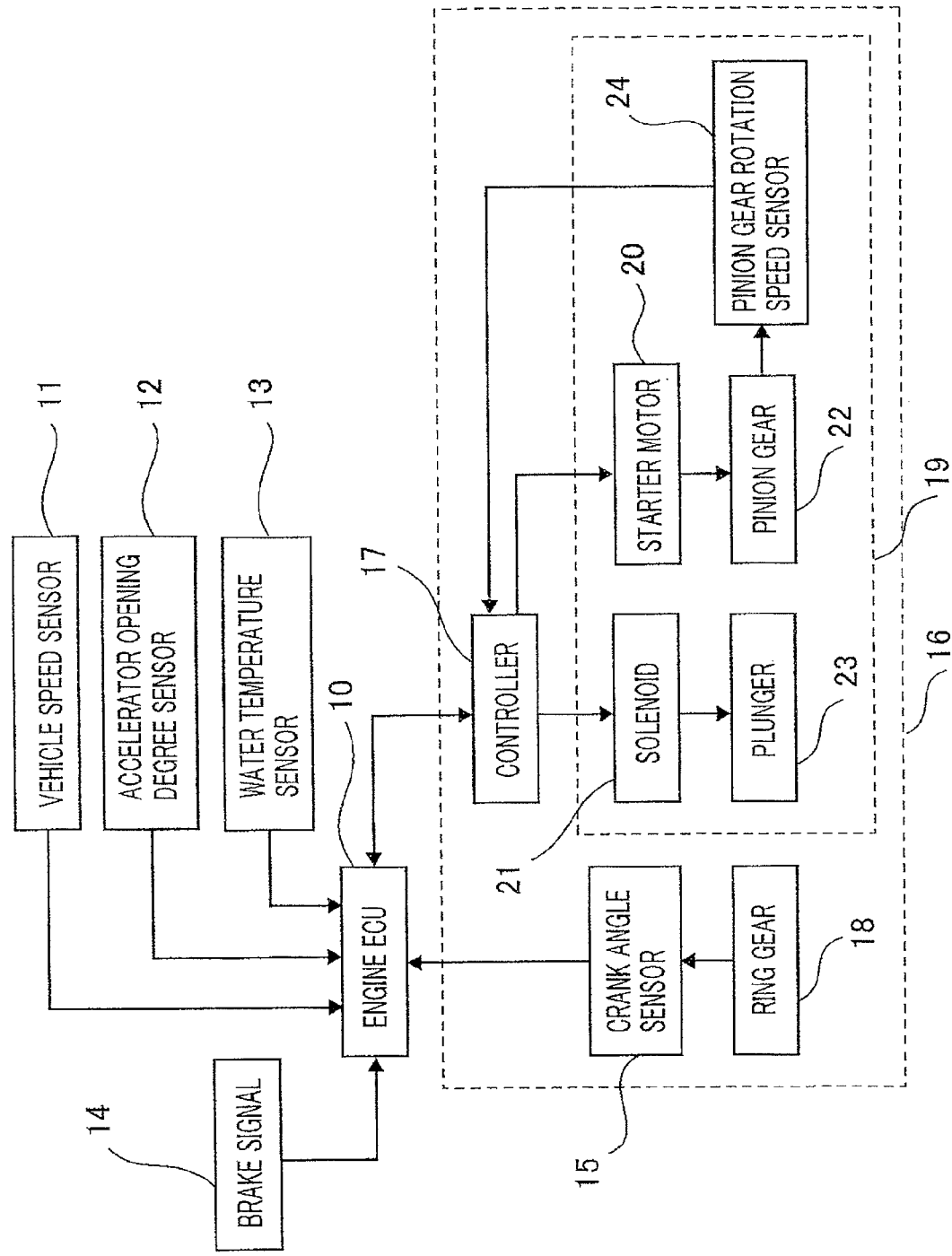
FIG. 1 is a block diagram illustrating the schematic configuration of an engine automatic-stop/restart system according to Embodiment 1 of the present invention.

Hereinafter, an engine automatic-stop/restart system according to Embodiment 1 of the present invention will be explained in detail with reference to figures. In each of the figures, the same or equivalent constituent elements are designated by the same reference characters.

FIG. 1 is a block diagram illustrating the schematic configuration of an engine automatic-stop/restart system according to Embodiment 1 of the present invention. In FIG. 1, an engine ECU 10 is connected with a vehicle speed sensor 11 that detects the speed of a vehicle and outputs a signal corresponding to the detection value (simply referred to as a vehicle speed signal, hereinafter), an accelerator opening degree sensor 12 that detects an accelerator opening degree and outputs a signal corresponding to the detection value (simply referred to as an accelerator opening degree signal, hereinafter), a water temperature sensor 13 that detects the temperature of coolant water for an engine (unillustrated) and outputs a signal corresponding to the detection value (simply referred to as an engine water temperature signal, hereinafter), a brake signal 14 that indicates the state of braking operation, and a crank angle sensor 15 that detects a crank angle for determining a cylinder that performs fuel injection and outputs a signal corresponding to the detection value (simply referred to as a crank angle signal, hereinafter). Each of the signals from these sensors serves as a driving state signal that indicates the state of vehicle driving by a driver.

Based on the signals from these sensors, the engine ECU 10 determines whether the engine is to be automatically stopped or to be restarted, gives a command to a controller 17 in an engine automatic-stop/restart system 16, and controls fuel injection into the engine.

The engine automatic-stop/restart system 16 includes the controller 17 that receives a command from the engine ECU 10, a ring gear 18 coupled with the crankshaft (unillustrated) of the engine, the foregoing crank angle sensor 15, and a starter 19.

The starter 19 is provided with a pinion gear 22 to which rotation of a starter motor 20 is transferred, a plunger 23 for pushing the pinion gear 22 in the axis direction thereof so that the pinion gear 22 engages with the ring gear 18, a solenoid 21 that moves the plunger 23 in the axis direction thereof when it is energized, and a pinion gear rotation speed sensor 24 that detects the rotation speed of the pinion gear 22 by unit of a hall device or the like and outputs a signal corresponding to the detection value (simply referred to as a pinion gear rotation speed signal, hereinafter). The controller 17 can separately control energization of the starter motor 20 and energization of the solenoid 21. The solenoid 21 and the plunger 23 configure a pinion gear driving unit.

Figure 2:
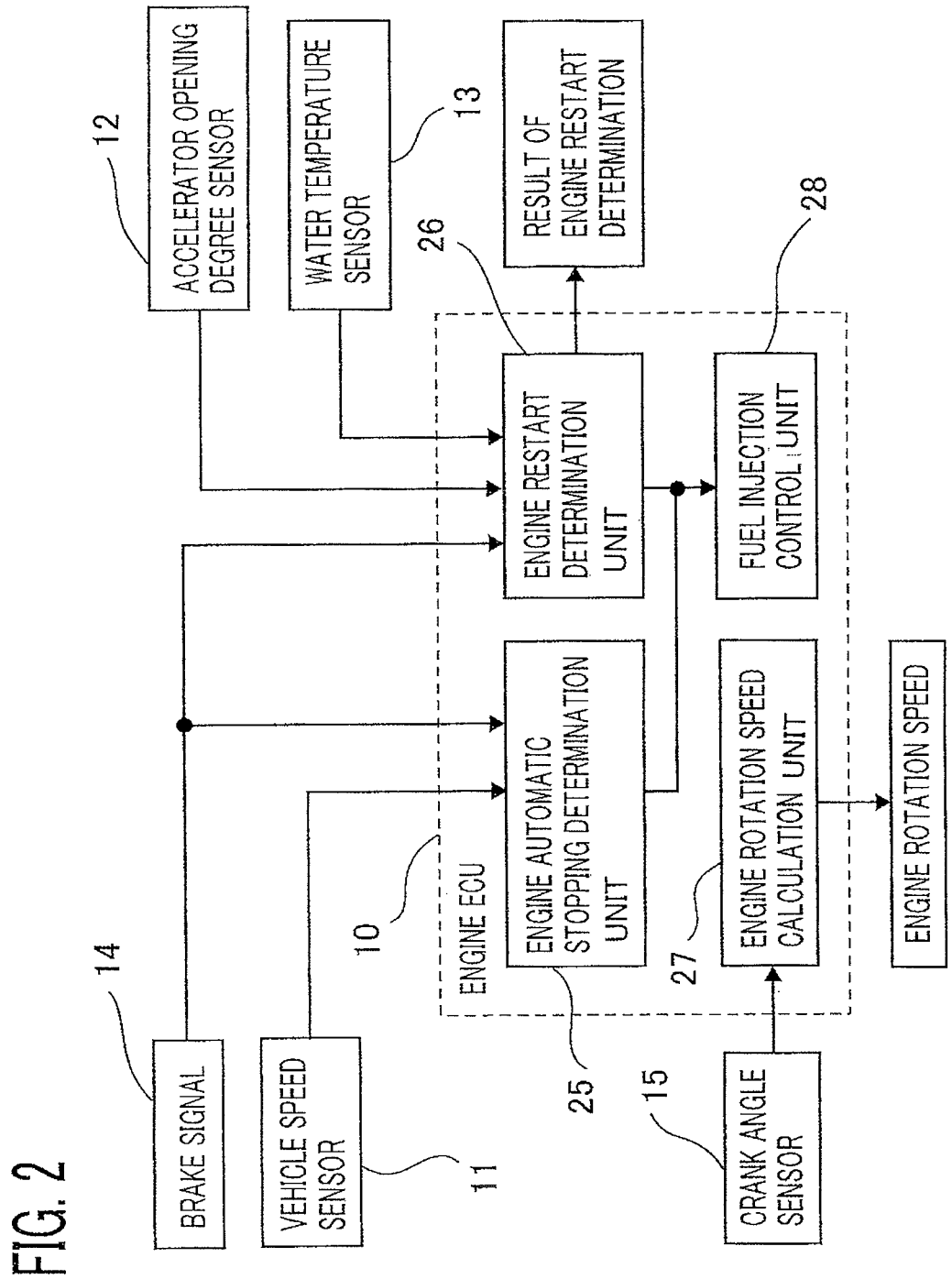
FIG. 2 is a block diagram illustrating the schematic configuration of an engine ECU in an engine automatic-stop/restart system according to Embodiment 1 of the present invention.

FIG. 2 is a block diagram illustrating the schematic configuration of an engine ECU in an engine automatic-stop/restart system according to Embodiment 1 of the present invention.

The engine ECU 10 is provided with an engine automatic stopping determination unit 25 that determines, in accordance with the brake signal 14 and the vehicle speed signal from the vehicle speed sensor 11, whether or not an engine automatic stopping condition (e.g., a condition that the vehicle speed is the same as or lower than 5 [km/h] and the brake pedal is being depressed by the driver) is satisfied; an engine restart determination unit 26 that determines, in accordance with the brake signal 14 and the accelerator opening degree signal from the accelerator opening degree sensor 12, whether or not an engine restarting condition (e.g., a condition that the driver has released the brake and the accelerator pedal is being depressed) is satisfied; an engine rotation speed calculation unit 27 that calculates the rotation speed of the engine, in accordance with the crank angle signal from the crank angle sensor 15 and outputs a signal corresponding to the calculation value (simply referred to as an engine rotation speed signal, hereinafter); and a fuel injection control unit 28 that controls fuel injection, in accordance with the results of determinations by the engine automatic stopping determination unit 25 and the engine restart determination unit 26.

Figure 3:
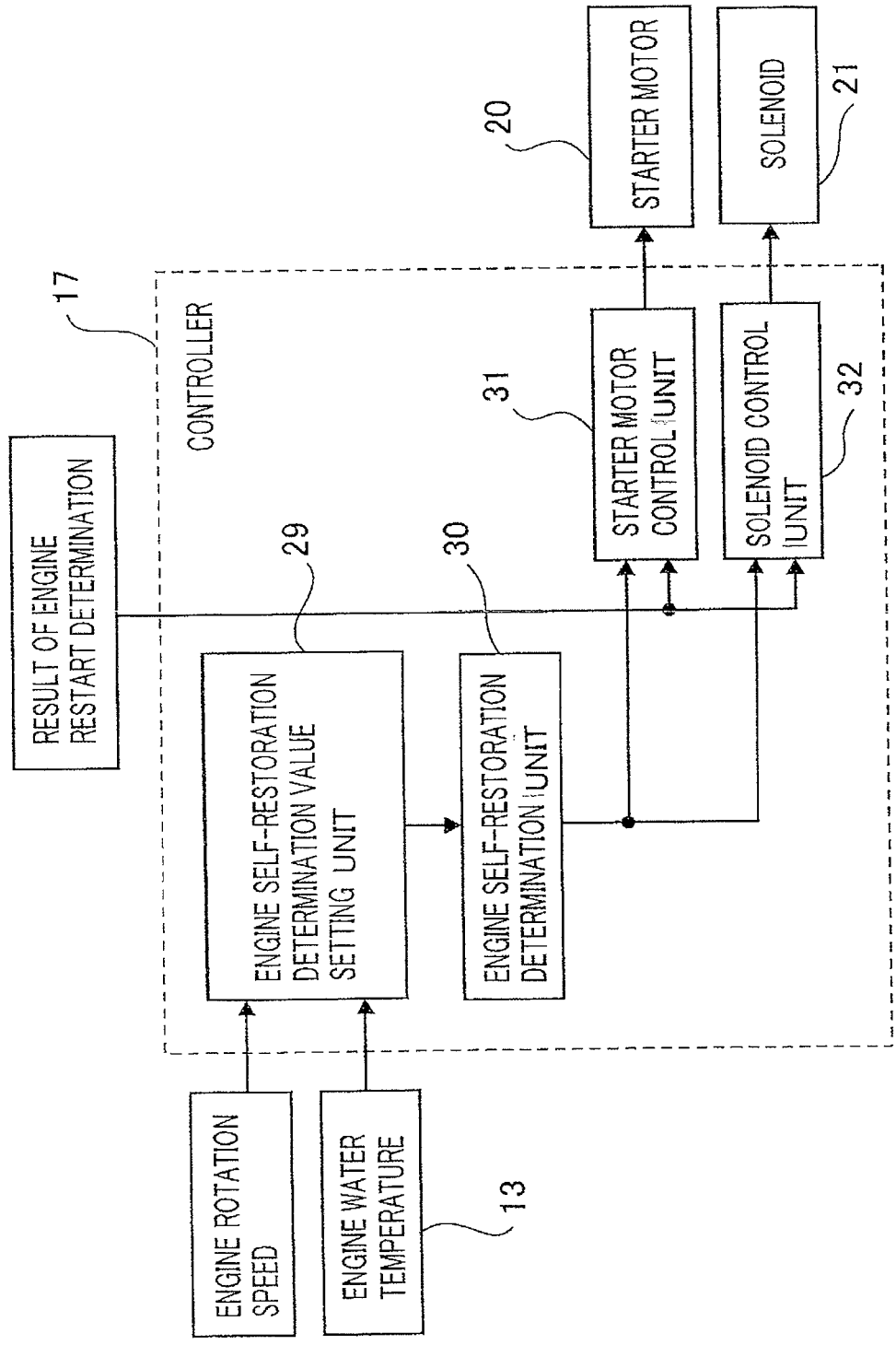
FIG. 3 is a block diagram illustrating the schematic configuration of a controller in an engine automatic-stop/restart system according to Embodiment 1 of the present invention.

FIG. 3 is a block diagram illustrating the schematic configuration of a controller in an engine automatic-stop/restart system according to Embodiment 1 of the present invention. The controller 17 is provided with an engine self-restoration determination value setting unit 29 that sets an engine self-restoration determination value, in accordance with the engine rotation speed signal calculated by the engine ECU 10 and the engine water temperature signal from the water temperature sensor 13; an engine self-restoration determination unit 30 that determines, by use of the determination value set by the engine self-restoration determination value setting unit 29, whether or not the engine can autonomously be restored merely by restarting fuel injection; a starter motor control unit 31 that controls the starter motor 20, in accordance with the result of engine restart determination by the engine restart determination unit 26 in the engine ECU 10 and the result of determination by the engine self-restoration determination unit 30; and a solenoid control unit 32 that controls energization of the solenoid 21, in accordance with the result of engine restart determination by the engine restart determination unit 26 in the engine ECU 10 and the result of determination by the engine self-restoration determination unit 30. The controller 17 calculates the engine rotation speed Nr, based on the period of the crank angle signal inputted from the crank angle sensor 15.

In addition, instead of being calculated by the controller 17, the engine rotation speed Nr may be calculated through another unit, for example, in such a way that there is provided a pulse generator or the like capable of detecting a pulse based on a rotary encoder or the teeth of the ring gear 18 and then FV conversion is applied to a signal from the pulse generator or the like.

Instead of being detected by the pinion gear rotation speed sensor 24, a pinion gear rotation speed Nst may be detected through another unit, for example, a rotation speed table corresponding to a voltage or a current applied to the starter motor 20.

In general, the number of teeth of the pinion gear 22 is smaller than that of the ring gear 18; in order to avoid confusion, in Embodiment 1 of the present invention, as the pinion gear rotation speed Nst and the engine rotation speed Nr, those converted into the rotation speed of the ring gear 18 are utilized in consideration of the tooth ratio between the pinion gear 22 and the ring gear 18.

Figure 4:
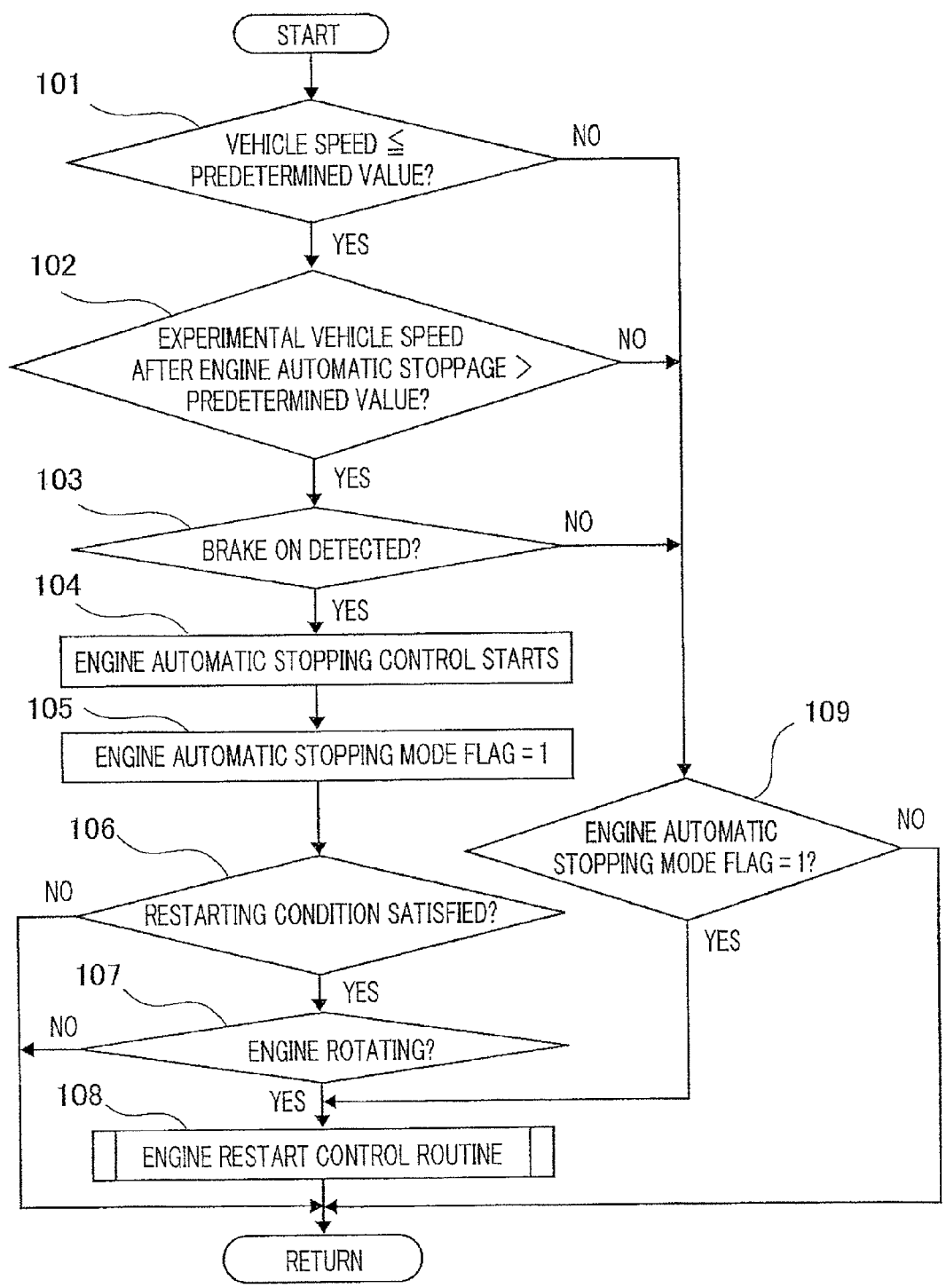
FIG. 4 is a flowchart representing the flow of a fuel cut control routine in an engine automatic-stop/restart system according to Embodiment 1 of the present invention.

Next, there will be explained the operation of an engine automatic-stop/restart system according to Embodiment 1 of the present invention. FIG. 4 is a flowchart representing the flow of a fuel cut control routine in an engine automatic-stop/restart system according to Embodiment 1 of the present invention. In FIG. 4, at first, in the steps 101 through 103, it is determined whether or not the engine automatic stopping condition has been satisfied. Specifically, in the step 101, it is determined whether or not the vehicle speed is the same as or lower than a predetermined value; in the case where the vehicle speed is the same as or lower than a predetermined value (YES), the step 101 is followed by the step 102; in the case where the vehicle speed is higher than a predetermined value (NO), the step 101 is followed by the step 109.

In the step 102, it is determined whether or not the experimental vehicle speed after an automatic stop of the engine is higher than a predetermined value; in the case where the experimental vehicle speed is higher than a predetermined value (YES), the step 102 is followed by the step 103; in the case where the experimental vehicle speed is the same as or lower than a predetermined value (NO), the step 102 is followed by the step 109. This condition "experimental vehicle speed" is a precondition of performing engine automatic stop and engine automatic restart without wastefully consuming the battery, by, in a traffic jam, repeating a traveling pattern such as "creeping travel—engine automatic stop—engine automatic restart—creeping travel—engine automatic restart". With regard to the experimental vehicle speed, as the predetermined value, there is set a vehicle speed (e.g., 10 [km/h]) at which it can be determined that the vehicle has transited from creeping travel to normal travel for which the accelerator pedal is depressed.

In the step 103, it is determined whether or not the brake signal 14 is "ON", i.e., the brake pedal is being depressed by the driver. In the case where it is determined that the brake signal 14 is "ON" (YES), the step 103 is followed by the step 104 so that engine automatic stopping control is started; in the case where it is determined that the brake signal 14 is not "ON" (NO), the step 103 is followed by the step 109.

In the step 104, fuel supply to the engine is stopped through fuel control by the engine ECU 10, and then, the step 104 is followed by the step 105. In the step 105, it is determined that the engine in the stop mode, and an engine automatic stopping mode flag is set to "1"; then, the step 105 is followed by the step 106.

In the step 106, while the engine rotation speed Nr decreases due to the inertial rotation of the engine, it is determined whether or not the engine restarting condition (e.g., the driver releases his foot from the brake pedal) has been satisfied in accordance with the accelerator opening degree signal from the accelerator opening degree sensor 12 and the brake signal 14 inputted to the engine ECU 10. After the determination, in the case where the restarting condition has been satisfied (YES), the step 106 is followed by the step 107; in the case where the restarting condition has not been satisfied (NO), the fuel cut control routine is ended.

In the step 107, it is determined whether or not the engine is rotating; in the case where it is determined that the engine is rotating (YES), the step 107 is followed by the step 108, i.e., the process jumps to the engine restart control routine represented in FIG. 5 described later. In the case where it is determined that the engine is not rotating (NO), the fuel cut control routine is ended. Here, with regard to the determination in the step 107 whether or not the engine is rotating, it may be determined that the engine has completely stopped, when the crank angle signal from the crank angle sensor 15 is not inputted to the engine ECU 10 for a given time.

In the case where it is determined that the engine automatic stopping condition has not been satisfied, i.e., in the case where the result of each of the determinations in the steps 101 through 103 is "NO", the process proceeds to the step 109. In the step 109, it is determined whether or not the engine automatic stopping mode flag is "1"; in the case where the engine automatic stopping mode flag is "1" (YES), it is determined that the engine is in the engine automatic stopping mode, and the step 109 is followed by the step 108, i.e., the process jumps to the engine restart control routine represented in FIG. 5. In the case where the engine automatic stopping mode flag is "0" (NO), it is determined that the engine is not in the automatic stopping mode, and the fuel cut control routine is ended.

Next, the engine restart control routine will be explained. FIG. 5 is a flowchart representing the flow of an engine restart control routine in an engine automatic-stop/restart system according to Embodiment 1 of the present invention. In FIG. 5, at first, it is determined in the step 201 whether or not the engine rotation speed Nr is the same as or lower than the engine self-restorable rotation speed Nr1 (e.g., 650 [rpm]). The term "engine self-restorable" unit that an engine can be autonomously restored (restarted) merely through restarting fuel supply and igniting the fuel, without cranking by the starter 19 being performed.

In the case where it is determined in the step 201 that the engine rotation speed Nr is higher than the engine self-restorable rotation speed Nr1 (NO), the step 201 is followed by the step 211, where non-starter-starting fuel injection is performed so that the engine is restarted merely by restarting fuel supply and igniting the fuel. In the case where it is determined in the step 201 that the engine rotation speed Nr is the same as or lower than the engine self-restorable rotation speed Nr1 (YES), the step 201 is followed by the step 202.

In the step 202, there is performed starter-starting fuel injection with which it is assumed that the engine is restarted by cranking through the starter 17; then, the step 202 is followed by the step 203, where the rotation of the pinion gear 22 is started through energization of the starter motor 20; then, the step 203 is followed by the step 204.

Here, the non-starter-starting fuel injection and the starter-starting fuel injection will be explained.

FIGS. 6A and 6B configure a set of explanatory chart representing starter-off-starting fuel injection and starter-on-starting fuel injection in an engine automatic-stop/restart system according to Embodiment 1 of the present invention; FIGS. 6A and 6B represent the non-starter-starting fuel injection and the starter-starting fuel injection, respectively. FIGS. 6A and 6B represent a case where the engine is 4-cylinder engine; the arrows in FIGS. 6A and 6B indicate ignition timings; it is assumed that ignition is kept interrupted while the engine is in the automatic stopping mode and is restarted at a predetermined timing (every crank angle B05°CA during the compression stroke) after the engine restart request is issued. In addition, "CB", "EX", "IN", and "CP" denote the combustion stroke, the exhaust stroke, the intake stroke, and the compression stroke, respectively.

At first, the non-starter-starting fuel injection will be explained with reference to FIG. 6A. In the case where, at a timing of the restart request, i.e., at a time instant when the restarting condition has been satisfied, it is determined that the engine rotation speed Nr is higher than the engine self-restorable rotation speed Nr1 and hence the engine can be restarted merely by restarting the non-starter-starting fuel injection so as to ignite, the engine can be restarted merely by performing normal sequential injection, for example, by performing fuel injection every crank angle B05°CA during the combustion stroke (the timing indicated by the hatched portion).

Next, the starter-starting fuel injection will be explained with reference to FIG. 6B. In the case where, at a timing of the restart request, i.e., at a time instant when the restarting condition has been satisfied, it is determined that the engine rotation speed Nr is the same as or lower than the engine self-restorable rotation speed Nr1 and hence there is performed engine restarting for which it is assumed that cranking is carried out, the fuel is injected into a predetermined number of cylinders (e.g., a cylinder in the intake stroke and a cylinder in the exhaust stroke) approximately at the same time when the restart request is issued (the timing A1 represented in FIG. 6B), and then the injection mode transits to the foregoing sequential injection.

In the case of the non-starter-starting fuel injection, at the timing A indicated in FIG. 6A, the fuel taken into a cylinder catches fire at the timing B, so that a first combustion is caused. In contrast, in the case of the starter-starting fuel injection, at the timing A1 indicated in FIG. 6B, the fuel taken into a cylinder catches fire at the timing B1, so that a first combustion is caused. As described above, restart through the starter-starting fuel injection can undergo the first combustion earlier (by the period corresponding to T1 indicated in FIG. 6B) than restart through the non-starter-starting fuel injection; as a result, because the engine self-restoration timing can also be advanced, the time of energizing the starter motor 20 can be shortened, whereby power consumption at a time when the engine is restarted can be suppressed.

Figure 5:
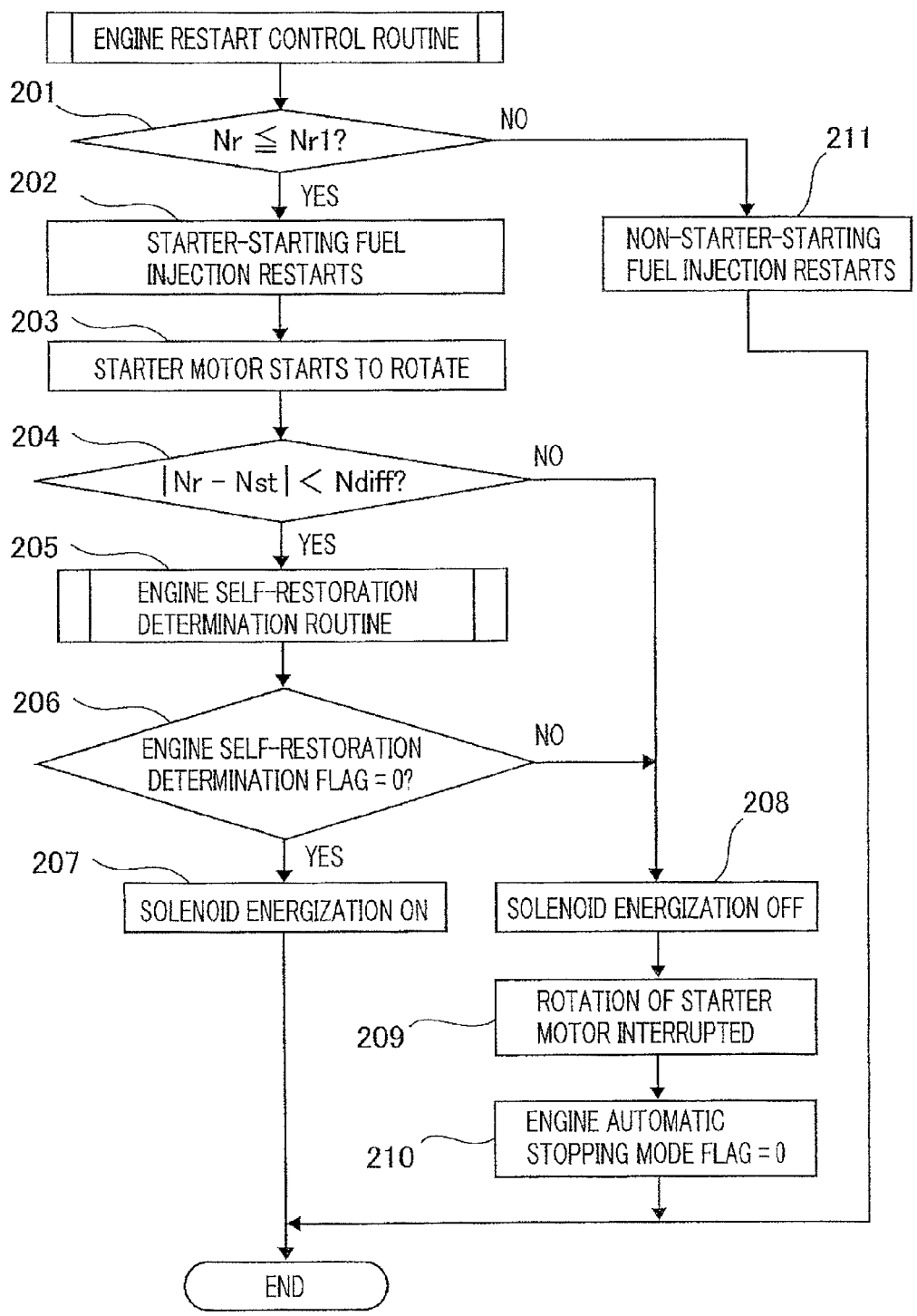
FIG. 5 is a flowchart representing the flow of an engine restart control routine in an engine automatic-stop/restart system according to Embodiment 1 of the present invention.

In FIG. 5, in the step 204, the rotation speed difference between the engine rotation speed Nr and the pinion gear rotation speed Nst and a predetermined rotation speed difference Ndiff (e.g., 100 [rpm]), at which the pinion gear 22 and the ring gear 18 can engage with each other, are compared with each other; in the case where the rotation speed difference between the engine rotation speed Nr and the pinion gear rotation speed Nst is smaller than the predetermined rotation speed difference Ndiff at which the pinion gear 22 and the ring gear 18 can engage with each other (YES), the step 204 is followed by the step 205, i.e., the process jumps to the engine self-restorability determination routine represented in FIG. 7.

In the case where the rotation speed difference between the engine rotation speed Nr and the pinion gear rotation speed Nst is the same as or larger than the predetermined rotation speed difference Ndiff at which the pinion gear 22 and the ring gear 18 can engage with each other (NO), the step 204 is followed by the step 208, where energization of the solenoid 21 is turned off. In this case, because no attractive force is produced between the solenoid 21 and the plunger 23, the plunger 23 does not move in its axis direction; therefore, the pinion gear 22 is not pushed out in the axis direction thereof, whereby the pinion gear 22 does not engage with the ring gear 18.

FIG. 7 is a flowchart representing the flow of an engine self-restoration determination routine in an engine automatic-stop/restart system according to Embodiment 1 of the present invention. In the engine self-restorability determination routine represented in FIG. 7, based on a change in the engine rotation speed Nr caused by combustion of the fuel supplied through the starter-starting fuel injection performed in the step 202 in FIG. 5 described above, it is determined whether the engine can autonomously be restored (restarted) merely through fuel supply, without cranking being performed.

In FIG. 7, at first, in the step 301, the immediately previous engine rotation speed Nr(n−1) at a time after idling-stop driving and the present engine rotation speed Nr(n) are compared with each other; in the case where the rotation speed difference between the immediately previous engine rotation speed Nr(n=1) and the present engine rotation speed Nr(n) is higher than an engine combustion determination value Nrbn (e.g., 50 [rpm]) at which it can be determined that the engine combustion is being performed (YES), the step 301 is followed by the step 302; then, an engine combustion determination counter counts up by "1", and then the step 302 is followed by the step 303. The immediately previous engine rotation speed Nr(n−1) at a time after idling-stop driving and the present engine rotation speed Nr(n) are compared with each other, and in the case where the rotation speed difference between the immediately previous engine rotation speed Nr(n−1) and the present engine rotation speed Nr(n) is the same as or lower than the engine combustion determination value Nrbn (NO), the step 301 is directly followed by the step 303. In addition, the engine combustion determination value Nrbn can be acquired by obtaining and analyzing the increasing behavior of the rotation speed of a subject engine when the engine is restarted.

In the step 303, it is determined whether or not the value of the engine combustion determination counter has reached the engine self-restoration determination value; in the case where the value of the engine combustion determination counter has reached the engine self-restoration determination value (YES), the step 303 is followed by the step 304, where an engine self-restorability flag is set to "1"; then, in the step 305, the engine combustion determination counter is reset, and then the process returns to the engine restart control routine. In the case where it is determined in the step 303 that the value of the engine combustion determination counter has not reached the engine self-restoration determination value (NO), the process directly returns to the engine restart control routine. In addition, Th engine self-restoration determination value is not reset until the engine rotation speed Nr exceeds a predetermined value (e.g., 700 [rpm]) after the engine automatic stopping condition has been satisfied.

The foregoing engine self-restoration determination value is set in accordance with the engine rotation speed Nr and the engine water temperature at a time when the engine restarting condition is satisfied. In the case where the engine rotation speed at a time when the engine restarting condition is satisfied is relatively high (e.g., the same as or higher than 650 [rpm]) at which the engine is likely to be autonomously restored merely by restarting fuel supply, the engine self-restoration determination value is decreased so that the determination criterion for engine self-restoration determination is relaxed; in the case where the engine rotation speed at a time when the engine restarting condition is satisfied is relatively low (e.g., lower than 650 [rpm]) at which it is difficult for the engine to be autonomously restored merely by restarting fuel supply, the engine self-restoration determination value is increased so that the determination criterion for engine self-restoration determination is tightened.

Figure 12:
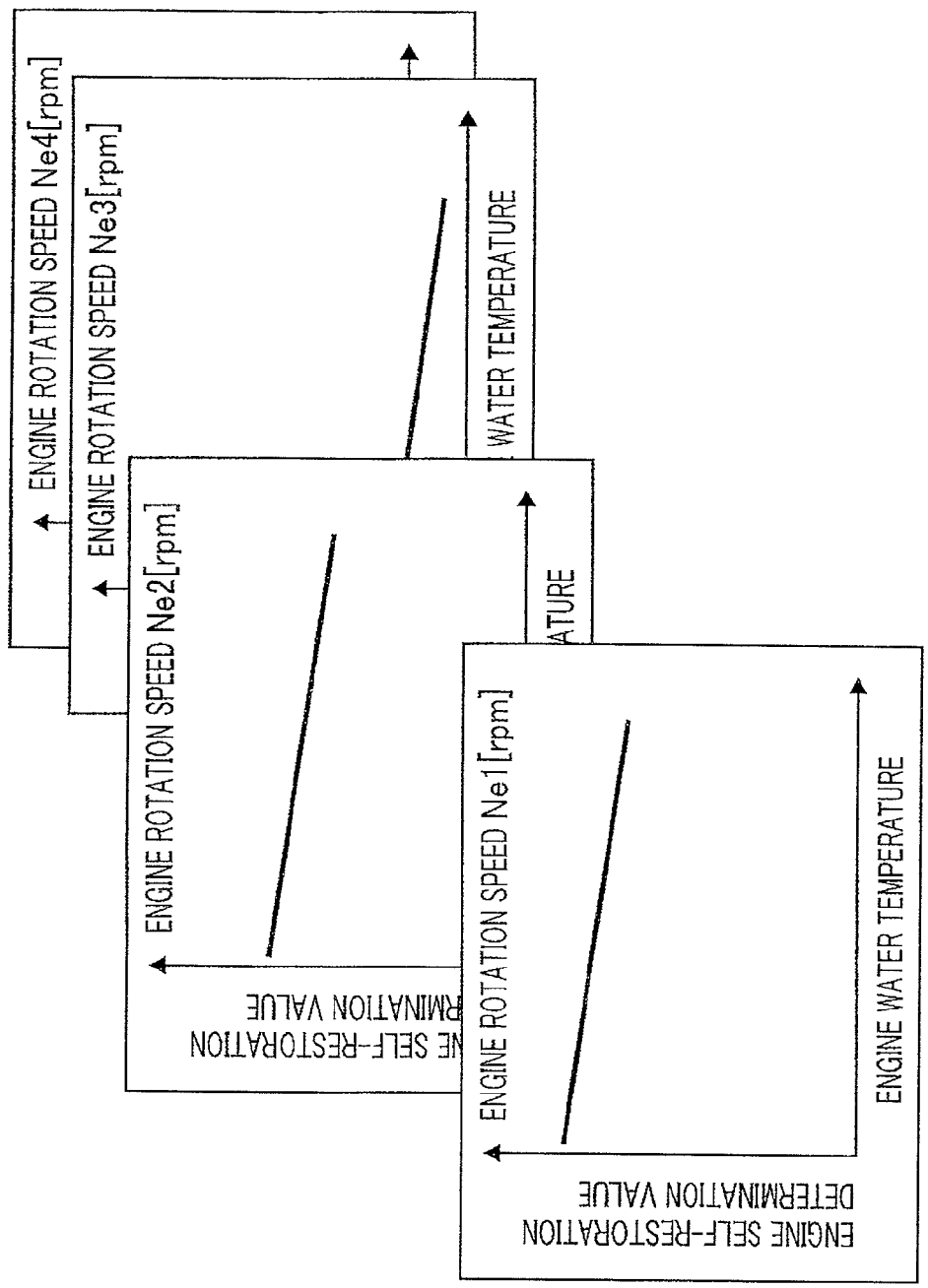
FIG. 12 is a set of explanatory charts representing a control map for setting a setting value for an engine self-restoration determination counter in an engine automatic-stop/restart system according to Embodiment 1 of the present invention.
Figure 13:
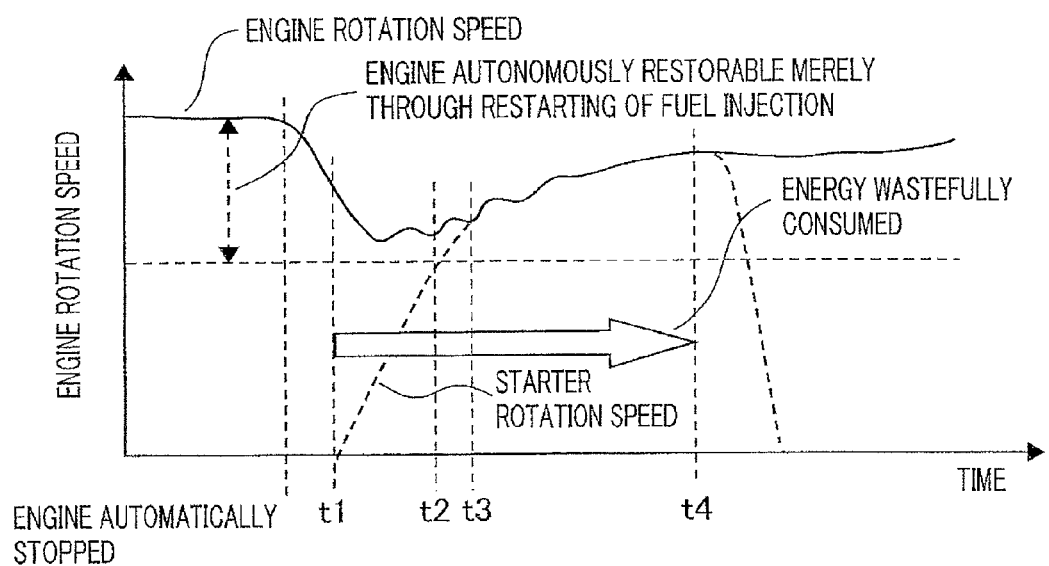
FIG. 13 is an explanatory graph for explaining the operation of a conventional system.
Figure 14A:
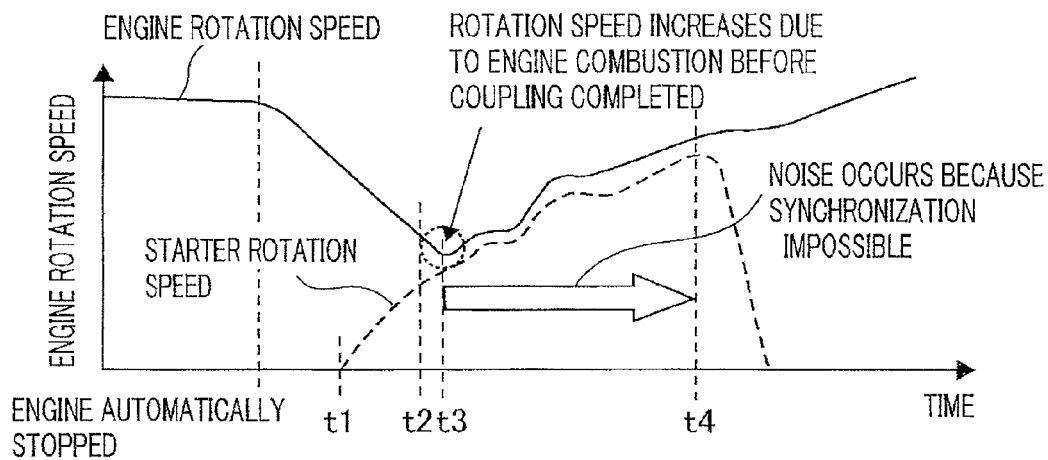
FIGS. 14A and 14B configure a set of explanatory graphs for explaining the operation of a conventional system.
Figure 14B:
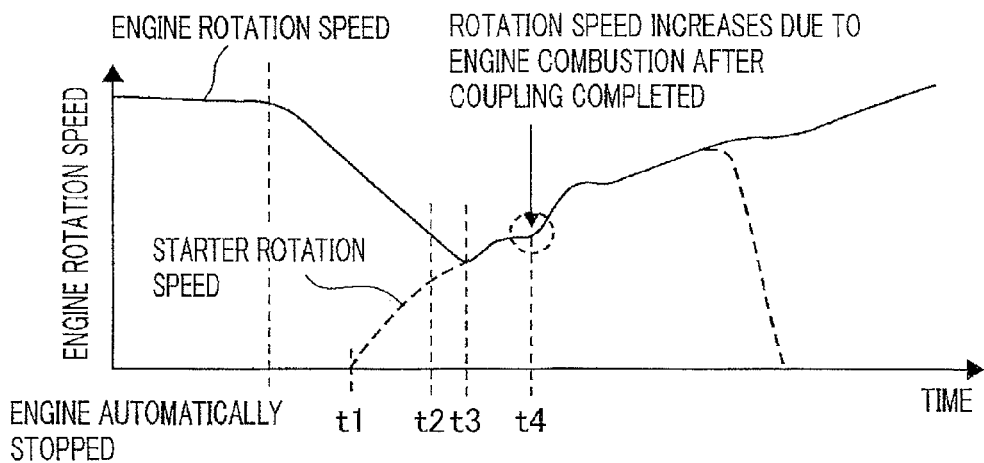
Figure 15:
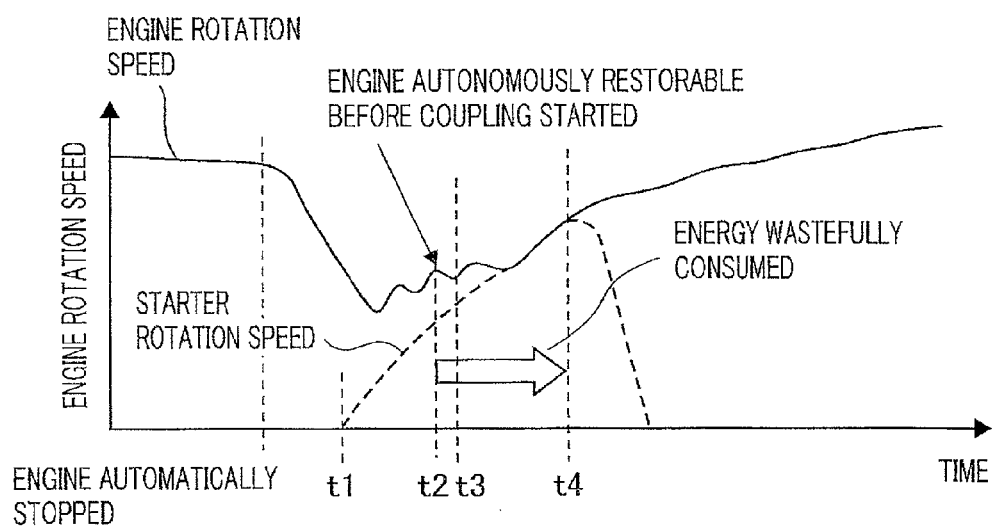
FIG. 15 is an explanatory graph for explaining the operation of a conventional system.

In general, there exists a tendency that the lower the water temperature is, the more difficult it is for the engine to combust the fuel, and the higher the water temperature, the easier it is for the engine to combust the fuel; therefore, the engine self-restoration determination value is set in such a way as to become smaller so that the determination criterion is more relaxed, as the engine water temperature rises. Specifically, based on a map represented in FIG. 12, the engine self-restoration determination value is calculated. That is to say, FIG. 12 is a set of explanatory charts representing a control map for setting a setting value for an engine self-restoration determination counter in an engine automatic-stop/restart system according to Embodiment 1 of the present invention. As represented in FIG. 12, for each arbitrary engine rotation speed, there is provide a control map in which the engine water temperature and the engine self-restoration determination value are set in the X axis and the Y axis, respectively, so that the engine self-restoration determination value is calculated in accordance with the engine rotation speed and the engine water temperature. The relationship among the respective engine rotation speeds in maps in FIG. 12 is Ne1<Ne2<Ne3<Ne4.

In the step 206 in FIG. 5, it is determined whether or not the engine self-restoration determination flag is "0"; in the case where it is determined that the engine self-restoration determination flag is "0" (YES), the step 206 is followed by the step 207, where energization of the solenoid 21 is turned on. In the case where it is determined in the step 206 that the engine self-restoration determination flag is not "0" (NO), it is determined that the engine can autonomously be restored merely by restarting fuel supply; thus, it is determined that cranking through the starter is not required any more, and then, the step 206 is followed by the step 208, where energization of the solenoid 21 is turned off; then, the step 208 is followed by the step 209, where the rotation of the starter motor 20 is stopped.

In the step 207, because it has been determined that cranking through the starter 19 is required, energization of the solenoid 21 is turned on, so that the electromagnetic attractive force produced between the solenoid 21 and the plunger 23 makes the plunger 23 move in the axis direction thereof to push out the pinion gear 22 so that the pinion gear 22 and the ring gear 18 engage with each other; then, the process returns to the fuel cut control routine represented in FIG. 4.

In the step 210, because the engine self-restoration (restart) from the engine automatic stop has been completed, the engine automatic stopping mode flag is set to "0"; then the process returns to the fuel cut control routine.

FIG. 8 is a timing chart representing an example of operation in an engine automatic-stop/restart system according to Embodiment 1 of the present invention. The timing chart in FIG. 8 represents operation performed in the case where the engine is automatically stopped when the vehicle is travelling, the pinion gear 22 and the ring gear 18 are engaged with each other while the engine rotates, and then the engine is restarted through cranking by the starter 19. In FIG. 8, reference numeral 401 represents changes with time of the engine rotation speed (solid line) and the starter motor rotation speed, i.e., the pinion gear rotation speed Nst (broken line), and reference numeral 402 represents the engine automatic stopping mode flag; when the engine is in the automatic stopping mode, the engine automatic stopping mode flag is set to "1", and when restarting of the engine has been completed, the engine automatic stopping mode flag is reset to "0".

Reference numeral 403 represents the status of energization of the solenoid 21; the plunger 23 is moved in the axis direction thereof by electromagnetic attractive force produced by turning on the energization of the solenoid 21, so that the pinion gear 22 is pushed out in the axis direction thereof and hence the pinion gear 22 and the ring gear 18 can be engaged with each other. Reference numeral 404 represents the operation of the engine combustion determination counter; based on the behavior of the engine rotation speed, it is determined whether or not supplied fuel is burning. Reference numeral 405 represents engine self-restorability flag, which is set to "1" when the value of the engine combustion determination counter becomes the same as or larger than a predetermined value (e.g., 6).

Next, with reference to FIG. 8, there will be explained the operation of an engine automatic-stop/restart system according to Embodiment 1 of the present invention. At a time instant t1 when the engine automatic stopping condition is satisfied while the vehicle travels, the engine automatic stopping mode flag 402 is set to "1"; however, at a time instant t2 when the engine restarting condition (e.g., the driver releases his foot from the brake pedal) is satisfied, the engine rotation speed Nr is the same as or lower than the engine self-restorable rotation speed Nr1 (the step 201 in FIG. 5); therefore, when the starter motor 20 starts to rotate, the foregoing starter-starting fuel injection is concurrently restarted (step 202 in FIG. 5).

Next, at a time instant t3 when the rotation speed difference between the engine rotation speed Nr and the pinion gear rotation speed Nst becomes smaller than the predetermined rotation speed difference Ndiff at which the pinion gear 22 and the ring gear 18 can engage with each other, the value of the engine combustion determination counter 404 has not reached the engine self-restoration determination value; therefore, the result of the determination in the step 303 included in the engine self-restoration determination routine in FIG. 7 becomes "NO", and the engine self-restoration determination flag is "0"; thus, the solenoid 21 is energized (step 207 in FIG. 5), so that the pinion gear 22 is pushed out and hence the pinion gear 22 and the ring gear 18 are engaged with each other.

Then, at a time instant t4, the engine rotation speed Nr and the starter motor rotation speed, i.e., the pinion gear rotation speed Nst, synchronize with each other, so that the pinion gear 22 and the ring gear 18 completely engage with each other. As is clear here, there occurs a time lag, i.e., a period from the time instant 3 when the pinion gear 22 starts to move in the axis direction thereof so as to start the engagement between the pinion gear 22 and the ring gear 18 to the time instant t4 when the pinion gear 22 and the ring gear 18 completely engage with each other and the pinion gear 22 completes its movement.

Next, as represented in FIG. 6B, the fuel injected at the time instant t2 during the intake stroke of #1 cylinder burns, and hence the first combustion of the engine occurs; the engine rotation speed Nr starts to increase and during the time period from a time instant t5 to a time instant t6, the engine combustion determination counter counts up by "1" (step 302 in FIG. 7). During the time period from the time instant t5 to the time instant t6, due to the repetition of the step 302 in FIG. 7, the engine combustion determination counter 404 twice counts up by "1".

Next, the fuel injected at the time instant t2 during the exhaust stroke of #3 cylinder burns at a time instant t7, and the engine rotation speed Nr increases again; during the time period from the time instant t7 to a time instant t8, the engine combustion determination counter 404 further counts up; at the time instant t8, the value of the engine combustion determination counter 404 becomes to be the engine self-restoration determination value (e.g., 6), and hence it is determined that the engine has become ready to autonomously rotate merely through fuel supply (step 303 in FIG. 7); the engine self-restorability flag is set to "1" (step 304 in FIG. 7); then, in order to release the engagement between the pinion gear 22 and the ring gear 18, the solenoid energization 403 is turned off so as to stop the rotation of the starter motor.

Next, with reference to FIG. 9, there will be explained the operation performed in the case where, although it is tried that the engine automatic stopping is performed while the vehicle travels and the pinion gear 22 and the ring gear 18 are engaged with each other while the engine rotates so that the engine is restarted through cranking by the starter 19, the first combustion of the engine occurs before the pinion gear 22 and the ring gear 18 are completely engaged with each other and hence the engine rotation speed Nr increases.

FIG. 9 is a timing chart representing an example of operation in an engine automatic-stop/restart system according to Embodiment 1 of the present invention. In FIG. 9, reference numeral 501 represents changes with time of the engine rotation speed (solid line) and the starter motor rotation speed, i.e., the pinion gear rotation speed Nst (broken line); reference numeral 502 represents the engine automatic stopping mode flag; reference numeral 503 represents the status of energization of the solenoid 21; reference numeral 504 represents the operation of the engine combustion determination counter; reference numeral 505 represents the engine self-restorability flag. Reference numerals 501, 502, 503, 504, and 505 correspond to reference numerals 401, 402, 403, 404, and 405, respectively, in FIG. 8.

In FIG. 9, at a time instant t1 when the engine automatic stopping condition is satisfied while the vehicle travels, the engine automatic stopping mode flag is set to "1"; however, at a time instant t2 when the engine restarting condition (e.g., the driver releases his foot from the brake pedal) is satisfied, the engine rotation speed Nr is the same as or lower than the engine self-restorable rotation speed Nr1 (the step 201 in FIG. 5); therefore, when the starter motor 20 starts to rotate, the foregoing starter-starting fuel injection is concurrently restarted (step 202 in FIG. 5).

Next, at a time instant t3 when the rotation speed difference between the engine rotation speed Nr and the pinion gear rotation speed Nst becomes smaller than the predetermined rotation speed difference Ndiff at which the pinion gear 22 and the ring gear 18 can engage with each other, the value of the engine combustion determination counter 404 has not reached the engine self-restoration determination value; therefore, the result of the determination in the step 303 included in the engine self-restoration determination routine in FIG. 7 becomes "NO", and the engine self-restoration determination flag is "0"; thus, the energization of the solenoid 21 is started.

As described above, at the time instant t3, in order to start the engagement between the pinion gear 22 and the ring gear 18, the pinion gear 22 starts to move; however, at a time instant t4 that is a timing before the pinion gear 22 and the ring gear 18 completely engage with each other, the fuel injected at the time instant t2 during the intake stroke of #1 cylinder burns, and hence the first combustion of the engine occurs; the engine rotation speed Nr starts to increase and during the time period from the time instant t4 to a time instant t5, the engine combustion determination counter counts up twice.

At a time instant t6, the fuel injected at the time instant t2 during the exhaust stroke of #3 cylinder represented in FIG. 6B burns, and the engine rotation speed Nr increases again; during the time period from the time instant t6 to a time instant t7, the engine combustion determination counter 504 counts up twice; at the time instant t7, the value of the engine combustion determination counter 504 becomes to be the engine self-restoration determination value (e.g., 6), and hence it is determined that the engine has become ready to autonomously rotate merely through fuel supply (step 303 in FIG. 7); the engine self-restorability flag 505 is set to "1"; then, in order to release the engagement between the pinion gear 22 and the ring gear 18, the solenoid energization (503) is turned off so as to stop the rotation of the starter motor 20.

During the time period from the time instant t4 to the time instant t7, although, at the time instant t3, energization of the solenoid 21 is turned on so as to push out the pinion gear 22, the first combustion occurs before the engagement between the pinion gear 22 and the ring gear 18 is completed, whereby the engine rotation speed Nr increases; therefore, the pinion gear 22 and the ring gear 18 strike each other while maintaining a relative rotation difference (in the so-called "gear-wiping" sate), and hence noise occurs. However, after the time instant t7, it is detected that the engine can autonomously be restored merely through fuel supply (the step 303 in FIG. 7), the engine self-restorability flag 505 is set to "1", and energization of the solenoid 503 is turned off, so that, because the coupling between the engine and the starter is released so as to interrupt the rotation of the starter motor 20, noise does not occur.

As described above, in the case where the engine rotation speed Nr is the same as or lower than the engine self-restorable rotation speed Nr1, concurrently with the start of the rotation of the starter motor 20, the foregoing starter-starting fuel injection is restarted (step 202 in FIG. 5); when the rotation speed difference between the ring gear 18 and the pinion gear 22 becomes smaller than a predetermined rotation speed difference at which the ring gear 18 and the pinion gear 22 can engage with each other, the engagement between the ring gear 18 and the pinion gear 22 is started, and then the engagement continues until it is determined that the engine can autonomously be restored merely through fuel supply; therefore, the engine can securely be restarted.

In the case where, after the pinion gear 22 and the ring gear 18 start to engage with each other, the engine is autonomously restored by the time the engagement is completed, energization of the solenoid 21 and the starter motor 20 is interrupted at a time instant when it is determined that the engine has been autonomously restored; therefore, noise, which is caused when the rotation speed difference between the pinion gear rotation speed Nst and the ring gear rotation speed, i.e., the engine rotation speed Nr increases and the rotation speeds interfere with each other, can be suppressed in such a way as to occur for a shortest time period, i.e., until it is determined that the engine can autonomously be restored. As a result, the wear and tear on the gears can be suppressed, whereby the lifetime of the starter can be prolonged.

Next, with reference to FIG. 10, there will be explained the operation performed in the case where idling-stop driving is performed while the vehicle travels, and because the engine rotation speed Nr at a time when the engine restarting condition is satisfied is higher that the engine self-restorable rotation speed Nr1, the engine is restarted without cranking by the starter 19 being performed.

FIG. 10 is a timing chart representing an example of operation in an engine automatic-stop/restart system according to Embodiment 1 of the present invention. In FIG. 10, reference numeral 601 represents the changes with time of the engine rotation speed; reference numeral 602 represents the engine automatic stopping mode flag; reference numeral 603 represents the status of energization of the solenoid 21; reference numeral 604 represents the operation of the engine combustion determination counter; reference numeral 605 represents the engine self-restorability flag. The foregoing items correspond to those in FIGS. 8 and 9.

In FIG. 10, at a time instant t1 when the engine automatic stopping condition is satisfied while the vehicle travels, the engine automatic stopping mode flag 402 is set to "1"; at a time instant t2 when the engine restarting condition (e.g., the driver releases his foot from the brake pedal) is satisfied, the engine rotation speed Nr is higher than the engine self-restorable rotation speed Nr1; therefore, the foregoing non-starter-starting fuel injection is restarted (step 211 in FIG. 5).

During the time period from time instants t3 to t4, the fuel injected, after the time instant t2, during the exhaust stroke of #4 cylinder represented in FIG. 6A burns resulting in a first combustion of the engine, the engine rotation speed Nr starts to increase, and then the engine combustion determination counter 604 counts up six times; at the time instant t4, the value of the engine combustion determination counter 604 becomes to be the engine self-restoration determination value (e.g., 6), and hence it is determined that the engine has become ready to autonomously rotate merely through fuel supply (step 303 in FIG. 7); then, the engine self-restorability flag 605 is set to "1", and after that, the engine can autonomously maintain its rotation merely through fuel supply. The engine automatic stopping mode flag 602 is reset to "0" at the time instant t4.

Next, with reference to FIG. 11, there will be explained the operation performed in the case where the engine is automatically stopped while the vehicle travels, and although, because the engine rotation speed Nr at a time when the engine restarting condition is satisfied is the same as or lower than the engine self-restorable rotation speed Nr1, the engine should originally be restarted through cranking by the starter 19, it is determined that that the engine can autonomously be restored merely through fuel supply, before the engagement between the pinion gear 22 and the ring gear 18 is started, and the engine is eventually restarted without performing the engagement between the pinion gear 22 and the ring gear 18 and cranking by the starter 19.

FIG. 11 is a timing chart representing an example of operation in an engine automatic-stop/restart system according to Embodiment 1 of the present invention, in the case where an engine is restarted without the starter and the engine being coupled with each other while the engine rotates. In FIG. 11, reference numeral 701 represents the changes with time of the engine rotation speed (solid line) and the starter motor rotation speed, i.e., the pinion gear rotation speed Nst (broken line); reference numeral 702 represents the engine automatic stopping mode flag; reference numeral 703 represents the status of energization of the solenoid 21; reference numeral 704 represents the operation of the engine combustion determination counter; reference numeral 705 represents the engine self-restorability flag. The foregoing items correspond to those in FIGS. 8, 9, and 10.

In FIG. 11, at a time instant t1 when the engine automatic stopping condition is satisfied while the vehicle travels, the engine automatic stopping mode flag 702 is set to "1"; at a time instant t2 when the engine restarting condition (e.g., the driver releases his foot from the brake pedal) is satisfied, the engine rotation speed Nr is the same as or lower than the engine self-restorable rotation speed Nr1; therefore, when the starter motor 20 starts to rotate, the foregoing starter-starting fuel injection is concurrently restarted (step 201 in FIG. 5).

Next, at a time instant t3, the fuel injected at the time instant t2 during the intake stroke of #1 cylinder represented in FIG. 6B burns to produce a first combustion of the engine, and the engine rotation speed Nr increases; then, during the time period from the time instant t3 to a time instant t4, the engine combustion determination counter 704 counts up three times. At a time instant t5, the fuel injected at the time instant t2 during the exhaust stroke of #3 cylinder represented in FIG. 6B burns, and the engine rotation speed Nr increases again; during the time period from the time instant t5 to a time instant t6, the engine combustion determination counter 704 counts up three times; at the time instant t6, the value of the engine combustion determination counter 704 becomes to be the engine self-restoration determination value (e.g., 6), and hence it is determined that the engine has become ready to autonomously rotate merely through fuel supply (step 303 in FIG. 7); then, the engine self-restorability flag 705 is set to "1" (step 304 in FIG. 7).

During the time period from the time instant t2 to the time instant t6, the rotation speed difference between the engine rotation speed Nr and the pinion gear rotation speed Nst is larger than the predetermined rotation speed difference Ndiff at which the engagement is possible; thus, there has not been performed the energization of the solenoid (703) for making the pinion gear 22 and the ring gear 18 engage with each other. Accordingly, after the time instant t6, the engine autonomously rotates merely through fuel supply, without cranking, and the engine rotation speed increases.

As described above, in the engine automatic-stop/restart system according to Embodiment 1 of the present invention, in the case where the engine rotation speed Nr at a time when the engine restarting condition is satisfied is higher than the engine self-restorable rotation speed Nr1, the engine is restarted merely through restarting fuel supply and igniting the fuel, without cranking by the starter 19 being performed, and in the case where, although the engine rotation speed Nr is the same as or lower than the engine self-restorable rotation speed Nr1 and hence cranking by the starter 19 needs to be performed, it is determined that the engine can autonomously be restored merely through fuel supply before the engagement between the pinion gear and the ring gear is started, the engagement between the pinion gear 22 and the ring gear 18 and the rotation of the starter motor 20 are not performed; therefore, the opportunity for the engine to be autonomously restored (restarted) merely through fuel supply is increased, and the opportunity for the pinion gear 22 to engage with the ring gear 18 through rotation of the starter motor 20 is decreased. As a result, the lifetime of the starter 19 can be prolonged, and power saving can be realized by omitting cranking.

In the case where the engagement between the pinion gear and the ring gear is required, as soon as the engine restarting condition is satisfied, fuel injection is performed in a plurality of cylinders; thus, compared with the case where fuel injection is performed in synchronization with the crank angle (normal sequential injection), the timing of restarting fuel injection can be advanced. As a result, there is advance the timing when the first combustion of the engine occurs, and it is determined that the rotation of the engine can be maintained merely through restarting fuel supply to the engine (the timing when it is determined that the engine can autonomously be restored, the engagement between the pinion gear and the ring gear is released, and then energization of the starter motor is turned off); thus, the time of energization of the starter motor can be shortened. Accordingly, the power consumption at a time when the engine is restarted can further be reduced.

In the case where the engine rotation speed at a time when the engine restarting condition is satisfied is the same as or higher than the engine self-restorable rotation speed Nr1 (an engine rotation region where it is relatively easy for the engine to be autonomously restored (restarted) merely by resuming fuel supply), the engine self-restoration determination value is decreased so that the engine self-restoration determination is completed in a short time, and in the case where the engine rotation speed at a time when the restart request is issued is lower than the engine self-restorable rotation speed Nr1 (an engine rotation region where it is difficult for the engine to be autonomously restored (restarted) merely by resuming fuel supply), the engine self-restoration determination value is increased to be relaxed so that the engine self-restoration determination is performed in a long time; thus, more opportunities for the engine to be autonomously restored (restarted) merely by resuming fuel supply is securely obtained, and the frequency of the engagement between the pinion gear 22 and the ring gear 18 through rotation of the starter motor is decreased, so that further suppression of the power consumption at a time when the engine is restarted and further prolongation of the lifetime of the starter can be achieved.

In the case where the engine rotation speed at a time when the engine is restarted is in the rotation region (e.g., lower than 650 [rpm]) where it is difficult for the engine to be autonomously restored (restarted) merely by resuming fuel supply, the determination criterion for the engine self-restoration determination is tightened; therefore, a restart failure due to an erroneous engine self-restoration determination (because, although the engine has not been autonomously restored, the coupling between the engine and the starter is released, an engine stall occurs) can be prevented, whereby secure engine restart can be achieved.

In the case where the water temperature at a time when the engine is restarted is in a water temperature region (e.g., the same as or higher than 60 [° C.]) where it is relatively easy for the engine to be autonomously restored (restarted) merely by resuming fuel supply, the determination criterion for the engine self-restoration determination is relaxed, so that as many opportunities as possible for the engine to be restarted merely by resuming fuel supply is securely obtained, and the frequency of the engagement between the pinion gear and the ring gear through rotation of the starter motor is decreased; thus, further suppression of the power consumption at a time when the engine is restarted and further prolongation of the lifetime of the starter can be achieved.

In the case where the water temperature at a time when the engine is restarted is in a water temperature region (e.g., lower than 60 [° C.]) where it is relatively difficult for the engine to be autonomously restored (restarted) merely by resuming fuel supply, the determination criterion for the engine self-restoration determination is tightened; therefore, a restart failure due to an erroneous engine self-restoration determination (because, although the engine has not been autonomously restored, the coupling between the engine and the starter is released, an engine stall occurs) can be prevented, whereby secure engine restart can be achieved.

Moreover, unlike a conventional system, it is not required that the engine rotation speed at a time instant when the pinion gear and the ring gear abut on each other is anticipated so that the motor rotation speed is made to synchronize with the engine rotation speed; therefore, no large load for accurately anticipating the engine rotation speed is imposed on ECU.

Various modifications and alterations of this invention will be apparent to those skilled in the art without departing from the scope and spirit of this invention, and it should be understood that this is not limited to the illustrative embodiments set forth herein.

What is claimed is:

1. An engine automatic-stop/restart system that automatically stops an engine when an engine stopping condition for stopping the engine is satisfied and that restarts the engine when an engine restarting condition for restarting the engine that has been stopped is satisfied, the engine automatic-stop/restart system comprising:
   a fuel injection control unit that stops fuel supply to the engine when the engine stopping condition is satisfied and resumes the fuel supply when the engine restarting condition is satisfied;
   a crank angle sensor that detects a crank angle of the engine;
   a ring gear coupled with the crankshaft of the engine;
   an engine rotation speed detection unit that detects a rotation speed of the engine;
   a starter motor that is energized to produce rotation output and is de-energized to stop;
   a pinion gear that is driven to rotate by the rotation output of the starter motor and transfers the rotation output of the starter motor to the ring gear;
   a pinion gear rotation speed detection unit that detects a rotation speed of the pinion gear;
   a pinion gear driving unit that is energized to move the pinion gear in the axis direction thereof and to engage the pinion gear with the ring gear and that is de-energized to release the engagement between the pinion gear and the ring gear; and
   an engine self-restoration determination unit that determines, based on a rotation speed of the engine detected by the engine rotation speed detection unit, whether or not there can be achieved self-restoration in which the engine restarts merely through resumption of fuel supply, in the case where the engine restarting condition is satisfied at a time after the fuel injection control unit has stopped the fuel supply to the engine and before the engine stops, wherein, in the case where the engine self-restoration determination unit determines that the engine can autonomously be restored, the fuel supply by the fuel injection control unit is resumed so that the engine is autonomously restored; and in the case where the engine self-restoration determination unit determines that the engine cannot autonomously be restored, the fuel supply by the fuel injection control unit is resumed, and based on an engine rotation speed detected by the engine rotation speed detection unit, a pinion gear rotation speed detected by the pinion gear rotation speed detection unit, and the result of determination by the engine self-restoration determination unit, there is performed the energization or de-energization of the pinion gear driving unit and the starter motor.

2. The engine automatic-stop/restart system according to claim 1, wherein, the fuel injection control unit resumes the fuel supply in accordance with a predetermined crank angle detected by the crank angle sensor, in the case where the engine rotation speed at a time instant when the engine restarting condition is satisfied is the same as or higher than a predetermined rotation speed, and resumes the fuel supply as soon as the engine restarting condition is satisfied, in the case where the engine rotation speed at a time instant when the engine restarting condition is satisfied is lower than the predetermined rotation speed.

3. The engine automatic-stop/restart system according to any one of claim 1, wherein the engine self-restoration determination unit counts the number of engine combustion determinations where the increase amount of an engine rotation speed at a time after the engine restarting condition has been satisfied is the same as or larger than a preliminarily set engine combustion determination value, and in the case where the counted number of engine combustion determinations is the same as or larger than an engine self-restoration determination value set in accordance with the engine rotation speed at a time when the engine restarting condition is satisfied, the engine self-restoration determination unit determines that the engine can autonomously be restored.

4. The engine automatic-stop/restart system according to any one of claim 2, wherein the engine self-restoration determination unit counts the number of engine combustion determinations where the increase amount of an engine rotation speed at a time after the engine restarting condition has been satisfied is the same as or larger than a preliminarily set engine combustion determination value, and in the case where the counted number of engine combustion determinations is the same as or larger than an engine self-restoration determination value set in accordance with the engine rotation speed at a time when the engine restarting condition is satisfied, the engine self-restoration determination unit determines that the engine can autonomously be restored.

5. The engine automatic-stop/restart system according to any one of claim 1, wherein the engine self-restoration determination unit counts the number of engine combustion determinations where the increase amount of an engine rotation speed at a time after the engine restarting condition has been satisfied is the same as or larger than a preliminarily set engine combustion determination value, and in the case where the counted number of engine combustion determinations is the same as or larger than an engine self-restoration determination value set in accordance with an engine water temperature at a time when the engine restarting condition is satisfied, the engine self-restoration determination unit determines that the engine can autonomously be restored.

6. The engine automatic-stop/restart system according to any one of claim 2, wherein the engine self-restoration determination unit counts the number of engine combustion determinations where the increase amount of an engine rotation speed at a time after the engine restarting condition has been satisfied is the same as or larger than a preliminarily set engine combustion determination value, and in the case where the counted number of engine combustion determinations is the same as or larger than an engine self-restoration determination value set in accordance with an engine water temperature at a time when the engine restarting condition is satisfied, the engine self-restoration determination unit determines that the engine can autonomously be restored.

\* \* \* \* \*